United States Patent
Kotake et al.

(10) Patent No.: US 7,657,065 B2
(45) Date of Patent: Feb. 2, 2010

(54) MARKER PLACEMENT INFORMATION ESTIMATING METHOD AND INFORMATION PROCESSING DEVICE

(75) Inventors: Daisuke Kotake, Yokohama (JP); Shinji Uchiyama, Yokohama (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 614 days.

(21) Appl. No.: 11/126,916

(22) Filed: May 11, 2005

(65) Prior Publication Data

US 2005/0253870 A1 Nov. 17, 2005

(30) Foreign Application Priority Data

May 14, 2004 (JP) ............... 2004-144891

(51) Int. Cl.
*G06K 9/00* (2006.01)
*G01C 9/00* (2006.01)
*G01C 17/00* (2006.01)
*G01C 19/00* (2006.01)
*G09G 5/00* (2006.01)

(52) U.S. Cl. ............... 382/106; 382/154; 382/123; 702/153; 345/633

(58) Field of Classification Search ............ None
See application file for complete search history.

(56) References Cited

U.S. PATENT DOCUMENTS

| | | | |
|---|---|---|---|
| 5,889,550 A * | 3/1999 | Reynolds | 348/139 |
| 6,137,491 A | 10/2000 | Szeliski | |
| 6,268,862 B1 * | 7/2001 | Uchiyama et al. | 345/427 |
| 6,985,619 B1 * | 1/2006 | Seta et al. | 382/154 |
| 7,035,760 B2 * | 4/2006 | Kobayashi et al. | 702/150 |
| 7,084,887 B1 * | 8/2006 | Sato et al. | 345/633 |
| 7,130,754 B2 * | 10/2006 | Satoh et al. | 702/95 |
| 7,190,331 B2 * | 3/2007 | Genc et al. | 345/9 |
| 7,274,380 B2 * | 9/2007 | Navab et al. | 345/633 |
| 7,529,387 B2 * | 5/2009 | Kotake et al. | 382/103 |

(Continued)

FOREIGN PATENT DOCUMENTS

| | | |
|---|---|---|
| JP | 11-84307 A | 3/1999 |
| JP | 2000-41173 A | 2/2000 |

OTHER PUBLICATIONS

Haralick, et al., "Review and analysis of solutions of the three point perspective . . . ", Int'l. J. Computer Vision, vol. 13, No. 3, pp. 331-356, 1994.

(Continued)

*Primary Examiner*—Vikkram Bali
*Assistant Examiner*—Michelle Entezari
(74) *Attorney, Agent, or Firm*—Canon U.S.A. Inc., I.P. Division

(57) ABSTRACT

A marker placement information estimating method includes a constraint condition setting step for setting a constraint condition that can be defined with a geometric condition regarding placement information of markers, a capturing step for capturing photographed images including a marker image, a marker detecting step for detecting markers from the photographed images, and an estimating step for estimating the placement information of the markers using the positions of the detected markers on the images and the constraint condition. Thus, even if a constraint condition regarding the placement of markers exists, the placement information can be obtained with precision so as to satisfy the constraint condition.

8 Claims, 11 Drawing Sheets

U.S. PATENT DOCUMENTS

| | | | |
|---|---|---|---|
| 2002/0095265 A1* | 7/2002 | Satoh et al. | 702/94 |
| 2002/0103617 A1* | 8/2002 | Uchiyama et al. | 702/150 |
| 2003/0037449 A1* | 2/2003 | Bani-Hashemi et al. | 33/286 |
| 2003/0080978 A1* | 5/2003 | Navab et al. | 345/633 |
| 2003/0144813 A1* | 7/2003 | Takemoto et al. | 702/153 |
| 2003/0182072 A1* | 9/2003 | Satoh et al. | 702/95 |
| 2003/0195526 A1* | 10/2003 | Vilsmeier | 606/130 |
| 2004/0021664 A1* | 2/2004 | Takemoto et al. | 345/419 |
| 2004/0128102 A1* | 7/2004 | Petty et al. | 702/150 |
| 2004/0176925 A1* | 9/2004 | Satoh et al. | 702/150 |
| 2008/0095407 A1* | 4/2008 | Stewart et al. | 382/106 |

OTHER PUBLICATIONS

Fischler, et al., "Random sample consensus: a paradigm for model fitting with applications to image analysis . . . ",Comm. ACM, vol. 24, No. 6, pp. 381-395, 1981.

J. Rekimoto, "Configuration method of augmented reality using 2-D matrix code", Interactive System and Software IV, Kindai Kagakusha, 1996.

Kato, M. Billinghurst, et al.,"Augmented reality based on marker tracing and calibration thereof", Japan Virtual Reality Academic Journal, vol. 4, No. 4, pp. 607-616, 1999.

A. State, et al.,"Superior augmented reality registration by integrating Landmark tracking and magnetic tracking", Proc. SIGGRAPH'96, pp. 429-438, 1996.

G. Baratoff, et al., "Interactive multi-marker calibration for augmented reality applications", Proc. ISMAR2002, pp. 107-116, 2002.

H. Kato, et al., "Virtual object manipulation on a table-top AR environment", Proc. ISAR2000, pp. 111-119, 2000.

S. Cornou; M. Dhome; P. Sayd, : "Architectural Reconstruction with Multiple Views and Geometric Constraints", British Machine Vision Conference, Norwick, UK, Sep. 8, 2003.

H. Kato; M. Billinghurst; I. Poupyrev ; K. Imamoto; K. Tachibana: "Virtual Object Manipulation on a Table-Top AR Environment", Augmented Reality, 2000, Oct. 5, 2000, pp. 111-119, Munich, Germany.

C. Maglone: "Bundle Adjustment with Object Space Geometric Constraints for Site modeling", Integrating Photogrammetric Techniques with Scene Analysis and Machine Vision, vol. 2486, Jan. 19, 1995, pp. 25-36, Orlando, FL, USA.

* cited by examiner

CYLINDER COORDINATE SYSTEM

SPHERE COORDINATE SYSTEM

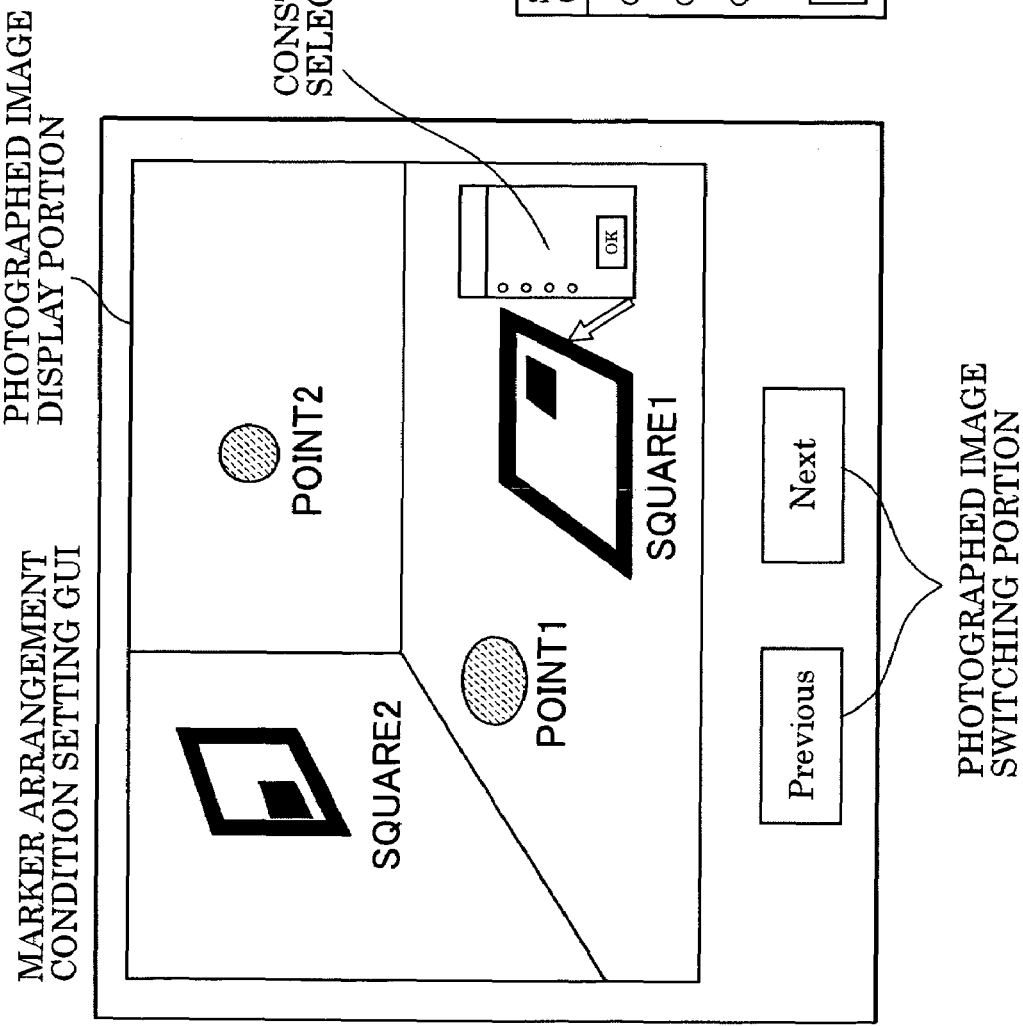

MARKER PLACEMENT INFORMATION ESTIMATING METHOD AND INFORMATION PROCESSING DEVICE

BACKGROUND OF THE INVENTION

1. Field of the Invention

The present invention relates to a method and device for estimating the placement information of a marker disposed within a 3-D space.

2. Description of the Related Art

In recent years, studies regarding MR (Mixed Reality) technology have been actively pursued. The MR technology is used for seamlessly integrating real space with virtual space created by a computer. Of the MR technology, AR (Augmented Reality; also referred to as enhanced reality) technology which superimposes virtual space over real space has particularly attracted attention.

An image display device on which the AR technology displays an image is realized by a video see-through method which displays a synthesized image obtained by superimposing a computer-generated image concerned with virtual space (a virtual object, character information, or the like, drawn with computer graphics) rendered according to the position and orientation of a later-described imaging device over an image of real space photographed using an imaging device such as a video camera, or by an optical see-through method which displays an image of virtual space rendered according to an observer's viewing position and orientation on an optical-see-through-type display mounted on the observer's head.

There are expectations for application of the AR technology to various fields such as surgical aids which superimposes the state within a patient's body over the surface of the body, an architectural simulation which superimposes a virtual building over an image of vacant land, assembly aids which superimposes assembly procedures and wiring for assembly of machines or other devices, and the like.

The most important problem to be solved in the AR technology is how to accurately perform the registration between real space and virtual space, and heretofore, many methods have been attempted. The registration problem in the AR technology corresponds to a problem of obtaining the position and orientation of an imaging device in a scene (i.e., in the reference coordinate system) in the case of the video see-through method. Similarly, in the case of the optical see-through method, the registration problem corresponds to a problem for obtaining the position and orientation of an observer or a display device in the scene.

A commonly-employed method for solving the former problem is to dispose artificial markers or make natural characteristic points markers in the scene, based on the correspondence between the projected positions of the markers within an image photographed by an imaging device and the positions in the reference coordinate system of the markers, so as to obtain the position and orientation of the imaging device in the reference coordinate system. Also, a commonly-employed method for solving the latter problem is to mount the imaging device on a target to be measured (e.g., an observer's head or display), with the position and orientation of the imaging device being obtained in the same way as with the former method, and the position and orientation of the target to be measured is obtained based thereupon.

Description will be made regarding a conventional example of a position-and-orientation measuring device for measuring the position and orientation of a later-described imaging device by correlating the 2-D coordinates of a marker to be detected from an image photographed by an imaging device and the 3-D position of the marker in the reference coordinate system with reference to FIG. 1. As illustrated in FIG. 1, a position-orientation measuring device 100 in the present conventional example includes a marker detecting unit 110 and position-orientation calculating unit 120, and is connected to an imaging device 130.

Also, K markers $Q_k$ (k=1, 2, and so on through K) of which the positions in the reference coordinate system are known are disposed in real space as the markers for obtaining the position and orientation of the imaging device 130. The example in FIG. 1 illustrates a situation in which four markers $Q_1$, $Q_2$, $Q_3$, and $Q_4$ are disposed. Of these, three markers $Q_1$, $Q_3$, and $Q_4$ are inside the field of view of the imaging device 130 and one marker $Q_2$ is outside the field of view of the imaging device 130.

The markers $Q_k$ can be any shape, such as a circular marker having a different color from other markers, or the like, as long as the projected position of a marker within a photographed image can be detected, and also the marker can be identified. For example, natural characteristic points within 3-D space may be employed, and such points may be detected within a photographed image using template matching. An image output from the imaging device 130 is input to the position-orientation measuring device 100. The marker detecting unit 110 inputs an image by the imaging device 130, and detects the image coordinates of the markers $Q_k$ photographed on the image. For example, in the event that each of the markers $Q_k$ is made up of a circular marker each having a different color, the marker detecting unit 110 detects a region corresponding to each marker color from on the input image, and takes the barycentric position as the detected coordinates of the marker.

Further, the marker detecting unit 110 outputs the image coordinates $u^{Mkn}$ of each detected marker $Q_{kn}$ and the identifier $k_n$ thereof to the position-orientation calculating unit 120. Here, n (=1, 2, and so on through N) is a symbol representing the serial number of the detected markers, and N represents the total number of the detected markers. For example, in the case of FIG. 1, N=3, so the identifiers $k_1$=1, $k_2$=3, $k_3$=4 and the image coordinates $u^{Mk1}$, $u^{Mk2}$, and $u^{Mk3}$ corresponding to these are output.

The position-orientation calculating unit 120 calculates the position and orientation of the imaging device 130 based on the correlation between the image coordinates $u^{Mkn}$ of each detected marker $Q_{kn}$ and the position in the reference coordinate system of the marker $Q_{kn}$, which is held as known information beforehand. A method for calculating the position and orientation of an imaging device based on a pair of the 3-D coordinates of a marker and image coordinates has been proposed in the field of photogrammetry as of old (for example, see R. M. Haralick, C. Lee, K. Ottenberg, and M. Nolle: "Review and analysis of solutions of the three point perspective pose estimation problem", Int'l. J. Computer Vision, vol. 13, no. 3, pp. 331-356, 1994 and M. A. Fischler and R. C. Bolles: "Random sample consensus: a paradigm for model fitting with applications to image analysis and automated cartography", Comm. ACM, vol. 24, no. 6, pp. 381-395, 1981). The position-orientation calculating unit 120 calculates the position and orientation of the imaging device 130 using the method described in R. M. Haralick, C. Lee, K. Ottenberg, and M. Nolle: "Review and analysis of solutions of the three point perspective pose estimation problem", Int'l. J. Computer Vision, vol. 13, no. 3, pp. 331-356, 1994, for example.

Note that description has been made regarding the case of employing markers (hereinafter, referred to as "point markers") as multiple points within 3-D space, but a calculation method for calculating the position and orientation of an imaging device using square-shaped markers (hereinafter, referred to as "square markers") having a known size has been proposed as disclosed in J. Rekimoto: "Configuration method of augmented reality using 2-D matrix code", Interactive System and Software IV, Kindai Kagakusha, 1996 and Kato, M. Billinghurst, Asano and Tachibana: "Augmented reality based on marker tracing and calibration thereof", Japan Virtual Reality Academic Journal, vol. 4, no. 4, pp. 607-616, 1999, for example. A calculation method of the position and orientation of an imaging device using combination of square markers and point markers has been proposed, as disclosed in H. Kato, M. Billinghurst, I. Poupyrev, K. Imamoto and K. Tachibana: "Virtual object manipulation on a table-top AR environment", Proc. ISAR2000, pp. 111-119, 2000, for example. With this calculation method, point markers have an advantage wherein point markers can set even in a narrow place, square markers have advantages wherein identification is easy, and the position and orientation of the imaging device can be obtained from only one marker since one marker includes sufficient information, thus utilizing these two types of markers in a complementary manner.

According to the aforementioned methods, based on an image photographed by an imaging device, the position and orientation of the imaging device has been acquired since the past.

On the other hand, an arrangement has been made in which a 6-degree-of-freedom position and orientation sensor such as a magnetic sensor, ultrasonic sensor, or the like is attached to an imaging device serving as a target to be measured, and the position and orientation the imaging device is measured by concomitant use with marker detection by image processing as described above, as disclosed in Japanese Patent Laid-Open No. 11-084307, Japanese Patent Laid-Open No. 2000-041173, and A. State, G. Hirota, D. T. Chen, W. F. Garrett and M. A. Livingston: "Superior augmented reality registration by integrating landmark tracking and magnetic tracking", Proc. SIGGRAPH'96, pp. 429-438, 1996. The accuracy of a sensor output changes depending on a measuring range, but can be obtained robustly, so a method using both sensor and image processing can improve robustness as compared with a method using image processing alone.

With a registration method using markers, the position in the reference coordinate system in the case of point markers and the position and orientation in the reference coordinate system in the case of square markers needs to be known for obtaining the position and orientation in the reference coordinate system of an imaging device serving as a target to be measured. In the case of a square marker, the square marker itself is often taken as the reference of the coordinate system without separately providing the reference coordinate system, but in the case of employing multiple square markers, the mutual position and orientation relations need to be known, and accordingly, there is no difference in that the reference coordinate system needs to be employed.

The position and orientation of a marker may be measured by hand using a measuring tape, ruler, or protractor, or by a surveying instrument, but measurement techniques utilizing images have been performed to improve accuracy and save time. The position of a point marker can be measured by a method called the bundle adjustment method. The bundle adjustment method is a method in which a great number of point markers are photographed by an imaging device, the position and orientation of the imaging device taking each image and the positions of point markers are obtained by repeated calculation so that the error between the projected positions where the markers are actually observed on the image, and the projected positions to be calculated from the position and orientation of the imaging device, and the positions of the markers, can be minimized.

Also, a method for measuring the position and orientation of multiple square markers disposed within 3-D space has been disclosed in G. Baratoff, A. Neubeck and H. Regenbrecht: "Interactive multi-marker calibration for augmented reality applications", Proc. ISMAR2002, pp. 107-116, 2002. With G. Baratoff, A. Neubeck and H. Regenbrecht: "Interactive multi-marker calibration for augmented reality applications", Proc. ISMAR2002, pp. 107-116, 2002, the position and orientation of an imaging device taking each image, and the position and orientation of each square marker are obtained using a method in which a great number of images of multiple square markers disposed within 3-D space are photographed, and repeated calculation is performed so that projection error can be minimized.

With the aforementioned conventional method for measuring the position and orientation of a marker, in the case that there is a constraint condition regarding the positions of markers such that multiple markers are on the same plane, the measured results cannot satisfy the constraint condition in some cases. This is because the aforementioned measuring method is a method for minimizing the projection error of markers on the photographed image, and accordingly, in the event that the parameters (the focal length of a camera, the position of a principal point, and a lens distortion correction parameter) employed for calculation of the projected position of a marker, and the observation position of a marker on an image include a margin of error, the measured values also include the margin of error. Consequently, measurement results are obtained that multiple markers, which should be on the same plane, are not on the same plane.

SUMMARY OF THE INVENTION

The present invention has been made in light of the aforementioned problems, and provides a method for obtaining the position and orientation of a marker so as to satisfy the constraint condition in the event there is a constraint condition regarding the placement of markers.

To this end, according to a first aspect of the present invention, a marker placement information estimating method for estimating spatial placement information of markers present within space under a geometric constraint includes: a marker detecting step for detecting markers from a photographed image including markers; a constraint condition setting step for setting a constraint condition of markers; a marker projected position calculating step for calculating a projected position where a marker is projected on an image surface based on the approximate value of the position and orientation of an imaging unit of the photographed image and the approximate value of the placement information of the marker; a correction value calculating step for obtaining a correction value for correcting the placement information of a marker so as to reduce a sum of error between the position of the marker on the image surface detected in the marker detecting step and the projected position of the marker on the image surface obtained in the marker projected position calculating step, and also so as to satisfy the constraint condition of markers set in the constraint condition setting step; a placement information correcting step for correcting the placement information of a marker based on the correction value obtained in the correction value calculating step; and a repeated calculating step for calculating the placement information of the marker by repeatedly performing the marker projected position calculating step, the correction value calculating step, and the placement information correcting step using the placement information of the marker corrected in the placement information correcting step instead of the projected position calculated in the marker projected position calculating step.

According to a second aspect of the present invention, a marker placement information estimating method for estimating the spatial placement information of markers from a photographed image includes: a constraint condition setting step for setting a constraint condition that can be defined with a geometric condition relating to the placement information of markers; a capturing step for capturing photographed images including marker images; a marker detecting step for detecting markers from the photographed images; and an estimating step for estimating the placement information of the markers based on the positions of the markers detected on the images and the constraint condition.

Other features and advantages of the present invention will be apparent from the following description of exemplary embodiments taken in conjunction with the accompanying drawings, in which like reference characters designate the same or similar parts throughout the figures thereof.

BRIEF DESCRIPTION OF THE DRAWINGS

FIGS. 15A through 15C are diagrams illustrating a GUI according to the fourth embodiment.

DESCRIPTION OF THE EMBODIMENTS

Description is made below regarding exemplary embodiments of the present invention with reference to the appended drawings.

First Embodiment

Figure 1:
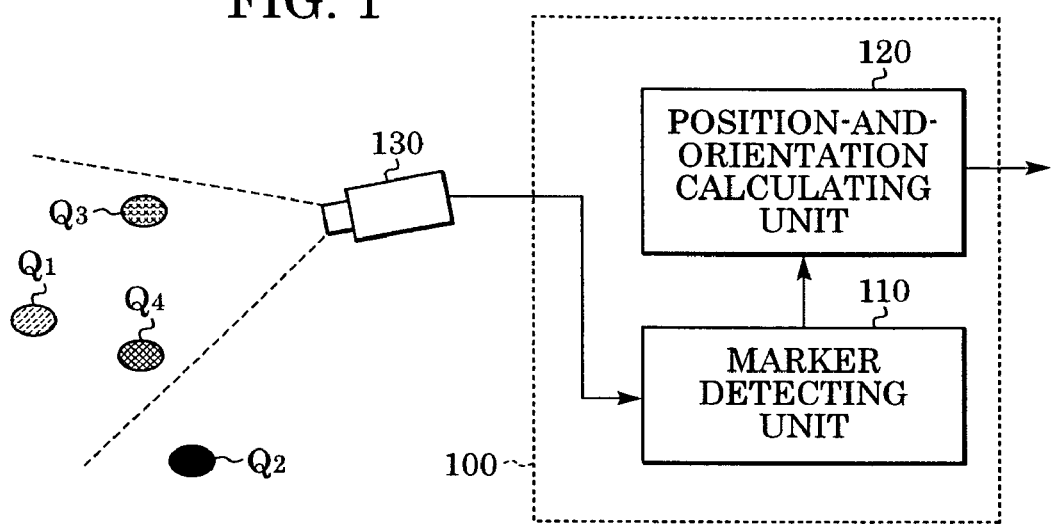
FIG. 1 is a diagram illustrating a conventional position-and-orientation measuring device.
Figure 2:
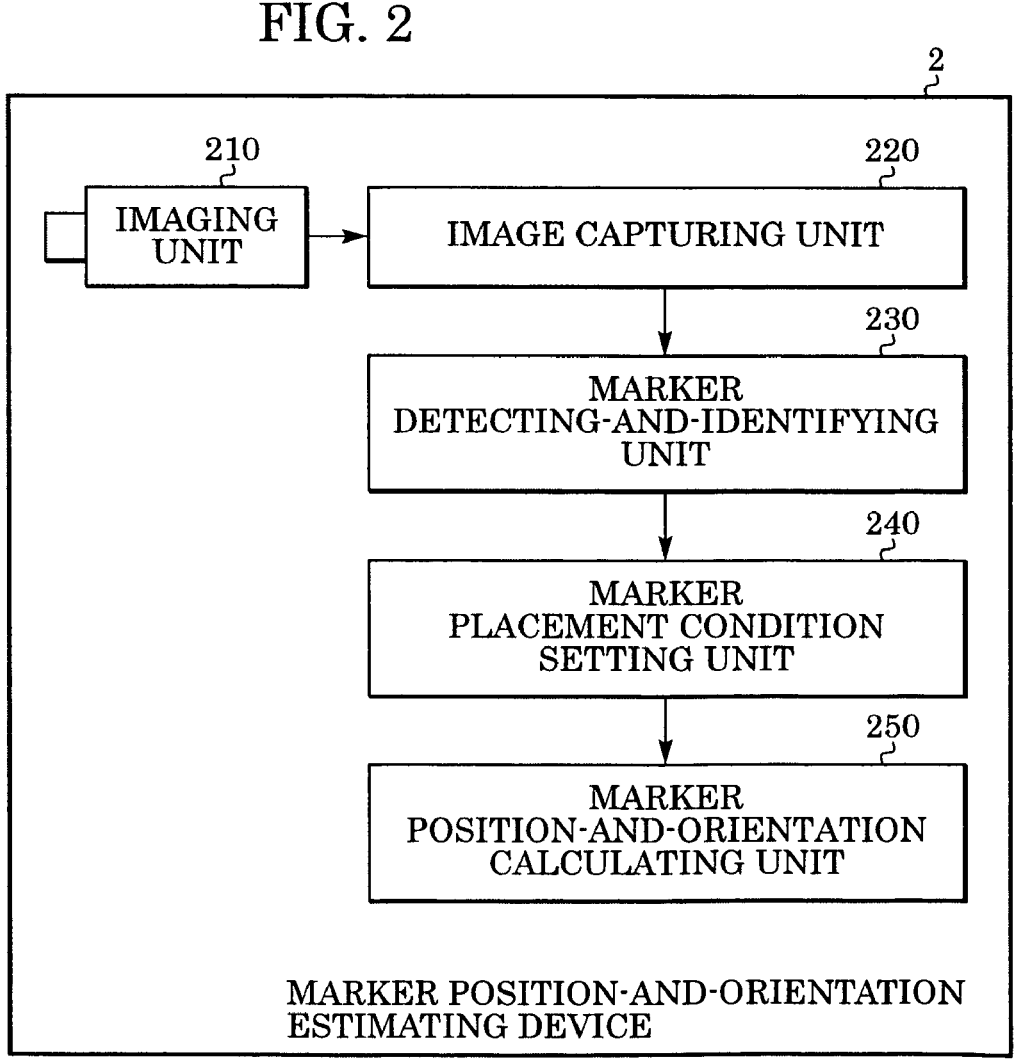
FIG. 2 is a block diagram illustrating the functional configuration of a marker position-and-orientation estimating device according to a first embodiment.

FIG. 2 is a block diagram illustrating the functional configuration of a marker position-and-orientation estimating device 2 according to the present embodiment. An imaging unit 210 is a camera, which photographs a scene in which markers are disposed. An image capturing unit 220 inputs an image photographed by the imaging unit 210 to a computer. A marker detecting-and-identifying unit 230 detects markers from the image input to the computer from the image capturing unit 220, and identifies each detected marker. A marker placement condition setting unit 240 sets a constraint condition regarding placement of markers. A marker position-and-orientation calculating unit 250 calculates the position and orientation of each marker so as to satisfy the constraint condition regarding the position of markers set by the marker placement condition setting unit 240 based on the marker detection results of the marker detecting-and-identifying unit 230.

Figure 3:
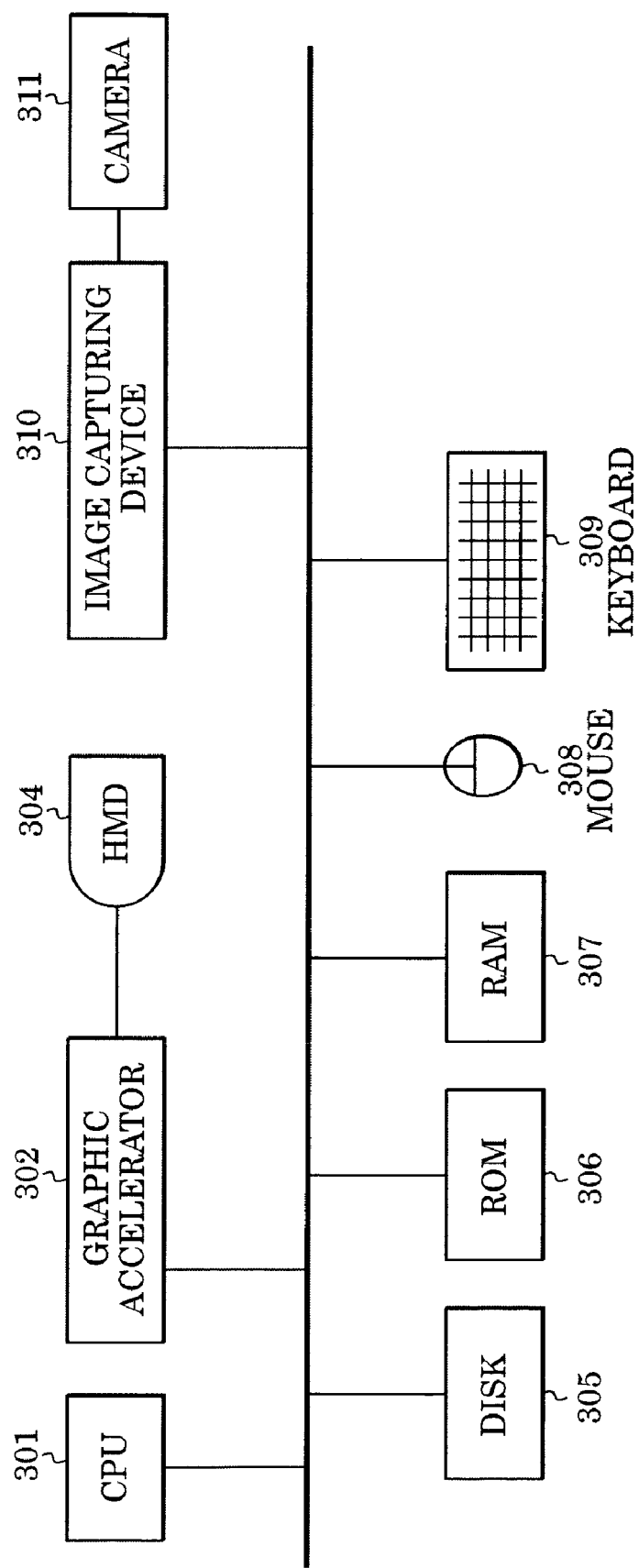
FIG. 3 is a block diagram illustrating the hardware configuration of the marker position-and-orientation estimating device according to the first embodiment.

FIG. 3 is a block diagram illustrating the hardware configuration of the marker position-and-orientation estimating device 2 according to the present embodiment. The hardware configuration illustrated in FIG. 3 is the same configuration as that of a common personal computer, but is further connected with an image capturing device 310 and a camera 311. The image capturing device 310 is for inputting an image photographed by the camera 311 to the computer, and corresponds to the image capturing unit 220. An example of the image capturing device 310 is a video capturing board, but is not restricted to this as long as an image photographed by a camera can be input. A CPU 301 serves as the marker detecting-and-identifying unit 230, marker placement condition setting unit 240, and marker position-orientation calculating unit 250 by executing a program stored in an unshown optical medium, external storage device, or the like.

The hardware configuration of the marker position-and-orientation estimating device 2 shown in FIG. 3 may also include other conventional computer components, such as a graphic accelerator 302 in communication with a head-mounted display (HMD) 304, a storage device, such as a disk 305, a read-only memory (ROM) 306, a random access memory (RAM) 307, and one or more input devices, such as a keyboard 309 and a mouse 308.

Next, description is made regarding the overview of operation of the marker position-and-orientation estimating device according to the present embodiment having the aforementioned configuration.

Figure 4A:
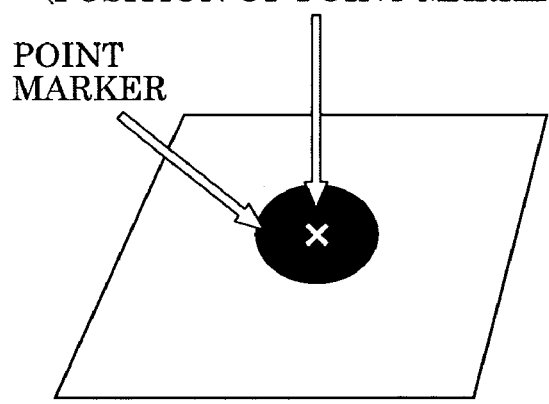
FIG. 4A is a diagram illustrating a point marker employed in the first embodiment.
Figure 4B:
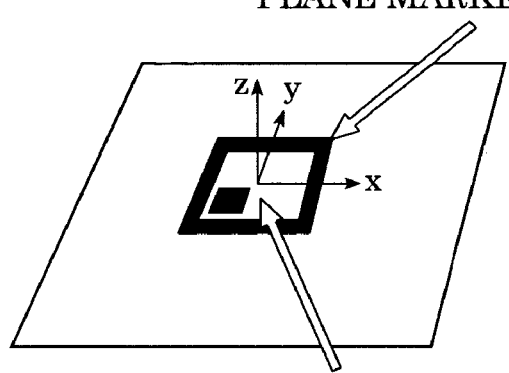
FIG. 4B is a diagram illustrating a plane marker employed in the first embodiment.

First, description is made regarding markers to be employed with the present embodiment. FIGS. 4A and 4B are diagrams illustrating markers to be employed with the present embodiment. FIG. 4A illustrates a point marker in which the placement information is represented by the position of a point in 3-D space. Let us say that point markers have a circular shape having a single color so as to be detected within an image, and the center of gravity of each point marker represents the position thereof in 3-D space. FIG. 4B illustrates a plane marker of which the placement information is represented by the position and orientation of a plane in 3-D space. The present embodiment employs square markers as plane markers, but plane markers are not restricted to square markers, so any shaped markers may be employed as long as markers have a form of a planar shape. Let us say that the center of a square, i.e., the intersecting point of two diagonal lines, represents the position of a square marker in 3-D space. As illustrated in FIG. 4B, let us say that the normal line direction of the square marker is taken as the z axis, the coordinate system of the square marker is assigned so that the x axis and y axis can be parallel to the two sides, and the orientation of the coordinate system of the square marker to the reference coordinate system is taken as the orientation of the square marker. The square markers according to the present embodiment are surrounded with a black frame so as to be easily detected on an image, so a square within the black frame is employed as a square marker.

(1. Photographing of Markers)

A user photographs many images of a scene in which markers are disposed using the imaging unit 210. The photographed images are input to the computer by the image capturing unit 220.

(2. Detection and Identification of Markers)

The marker detecting-and-identifying unit 230 detects markers from the photographed images input to the computer, and performs identification thereof. Here, the term "detection of a marker" means to obtain the image coordinates of a marker on a 2-D image. In the case of point markers, the image coordinates of the center of gravity of marker region on an image are obtained, and, in the case of square markers, the image coordinates of each vertex are obtained. The image coordinates of a marker may be obtained automatically, or may be manually specified, for example, by the user clicking on the image with a mouse. In the case of obtaining the position of a point marker automatically, for example, a pixel having the same color as a marker is extracted based on whether or not the pixel belongs to the specific region of a YUV color space image corresponding to the color, a marker region is obtained by labeling the pixels connected as the same color, and the center of gravity of the marker region within the image is calculated. Also, in the case of obtaining the position of each vertex of a square marker automatically, for example, an input image is converted into binarized image, the black frame region of a square marker is detected, and a quadrangle inscribing the black frame region is obtained.

The term "identification of a marker" means to identify a marker to be detected within an image as a unique marker. Identification of a marker may be performed automatically, or may be performed manually by the user. In the case of identifying a point marker automatically, for example, multiple markers having different colors are employed, and identification is performed based on the labeling color of the marker region at the time of detection of markers. Also, in the case of identifying a square marker automatically, for example, identification is performed by giving a unique pattern to each marker.

(3. Setting of a Marker Placement Condition)

Figure 5:
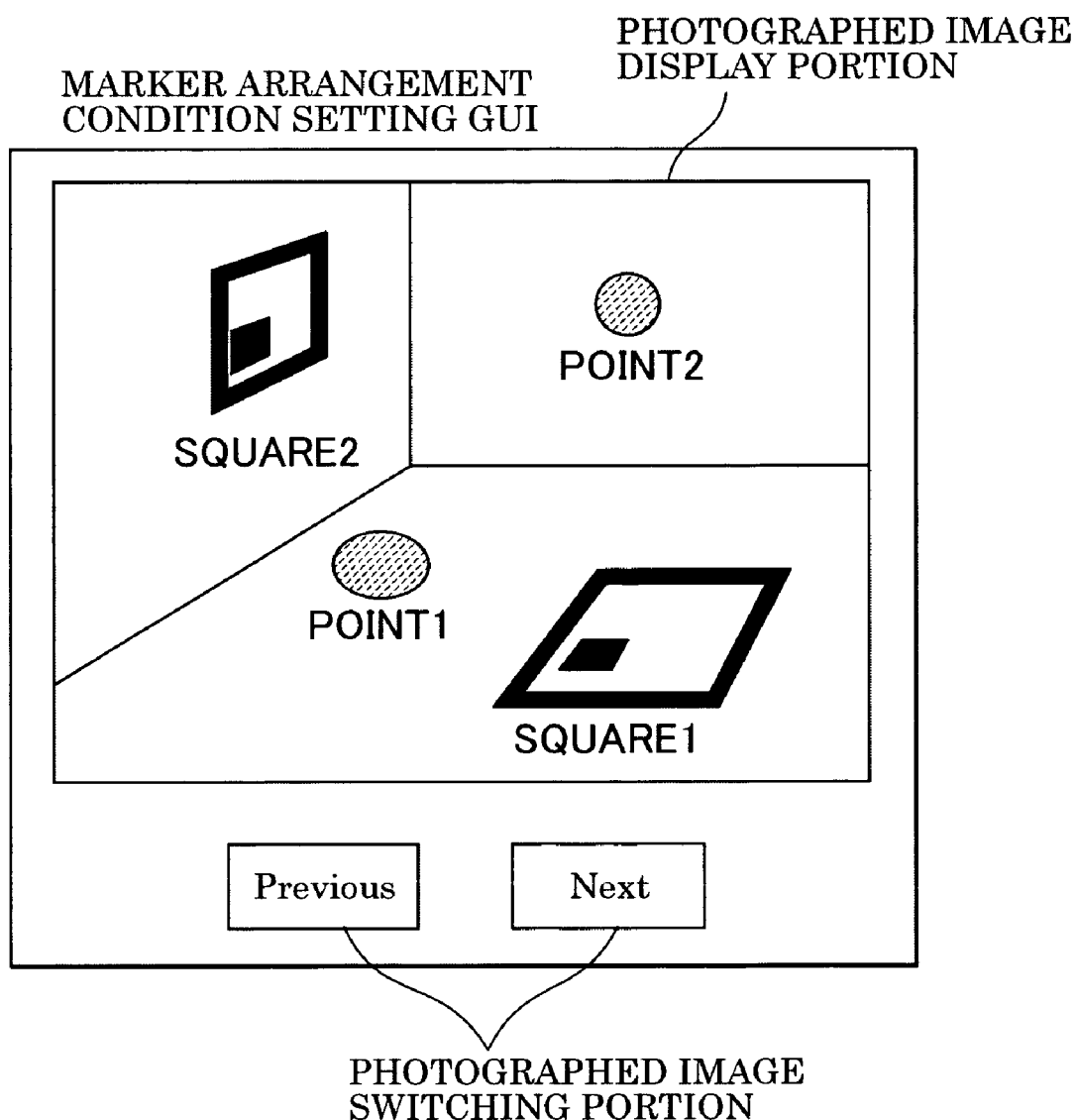
FIG. 5 is a diagram illustrating a GUI (Graphical User Interface) for setting multiple markers present on the same plane.

The user sets a constraint condition regarding the placement of markers using the marker placement condition setting unit 240. With the present embodiment, a constraint condition that multiple markers exist on the same plane is given as a constraint condition regarding the placement of markers. Let us say that a plane employed here is an unknown plane, and multiple unknown planes exist. FIG. 5 illustrates a GUI (Graphical User Interface) for setting multiple markers present on the same plane. A photographed image switching portion exists on the GUI, where an image photographed by the imaging unit is displayed. Display of a photographed image may be switched with a button on the photographed image switching portion. Upon the user clicking a Previous button with the mouse, the previous photographed image is displayed. Upon the user clicking a Next button, the subsequent photographed image is displayed. The user sets markers on the same plane while watching the photographed image. On the photographed image, the name unique to each marker is displayed near each identified marker. FIG. 5 illustrates the case that a photographed image in which two point markers (POINT1 and POINT2 in the drawing) and two square markers (SQUARE1 and SQUARE2 in the drawing) are photographed is displayed on the photographed image display portion. Let us say that of these markers, the point marker POINT1 and the square marker SQUARE1 exist on the same plane. The user selects either POINT1 or SQUARE1 within the photographed image by clicking near either marker with the mouse. The name of the selected marker is changed to bold face. Next, the user forms a group from markers on the same plane by clicking nearby markers present on the same plane with the left mouse button as the selected marker while depressing the shift key. In the case of clicking on a marker belonging to a group present on the same plane, the name display of all of the markers belonging to the group is changed to bold face. In this state, the marker can be added to the group by the user clicking another marker with the left mouse button while depressing the shift key. Also, the user clicking nearby a marker belonging to a group with the right mouse button while depressing the shift key releases the marker from the group, and the user clicking the same marker with the right mouse button without depressing the shift key releases the entire group.

(4. Calculation of the Position and Orientation of a Marker)

Figure 6:
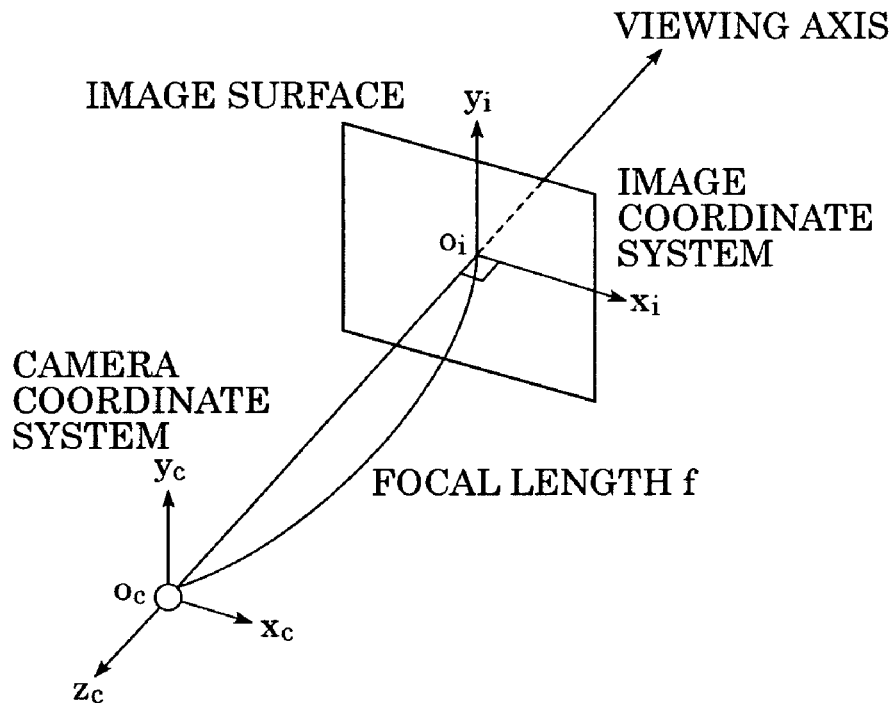
FIG. 6 is a diagram illustrating a camera coordinate system and an image coordinate system.

The position and orientation of a marker in the reference coordinate system is calculated based on the detection and identification results of the marker and the constraint condition regarding the placement of markers. First, description is made regarding perspective projection transform. FIG. 6 is a diagram illustrating the camera coordinate system and the image coordinate system. Let us say that the intersecting point between the viewing axis and an image surface is taken as the origin $O_i$ of the image coordinate system, the horizontal direction of an image is taken as the $x_i$ axis, and the vertical direction of the image is taken as the $y_i$ axis. Also, let us say that the focal length between the origin $O_c$ of the camera coordinate system and the image surface is f, the $z_c$ axis of the camera coordinate system is taken in the opposite direction of the viewing axis, the $x_c$ axis is taken in the direction in parallel with the horizontal direction of the image, and the $y_c$ axis is taken in the direction in parallel with the vertical direction of the image.

According to perspective projection transform, the point $x_c = [x_c\ y_c\ z_c]^t$ on the camera coordinate system is projected on a point of which the image coordinates are $u = [u_x\ u_y]^t$ as shown in Expression (2).

$$u_x = -f \frac{x_c}{z_c}$$
$$u_y = -f \frac{y_c}{z_c}$$
(2)

Figure 7:
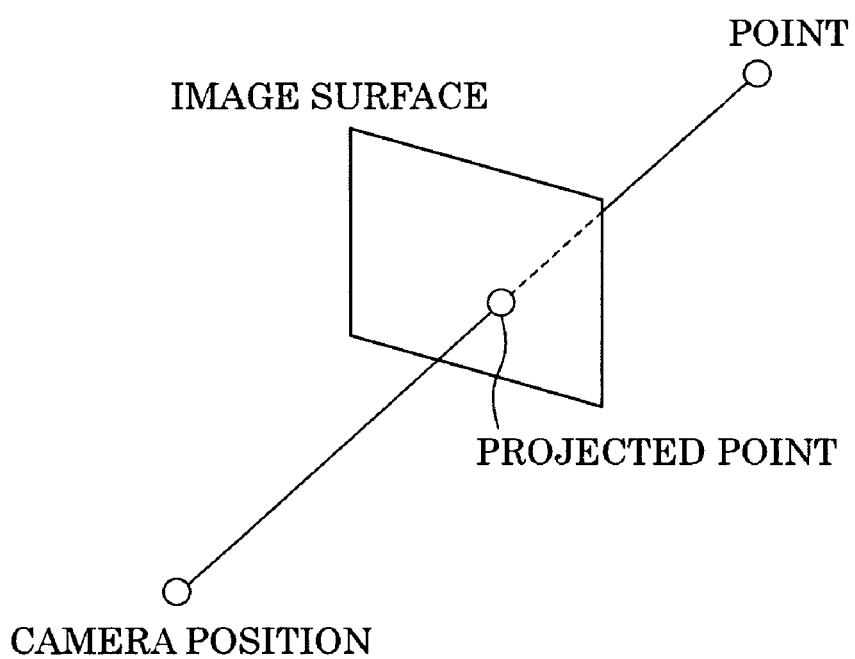
FIG. 7 is a diagram illustrating a collinear condition equation.

With the present embodiment, let us say that lens distortion does not exist, or has been corrected, and the camera is a pin-hole camera. As illustrated in FIG. 7, Expression 1 represents that a point in space, the projected point of the point on an image, and a camera position (viewpoint) exist on the same straight line, and is also referred to as a collinear condition.

In the reference coordinate system, let us say that the camera position is $t = [t_x\ t_y\ t_z]^t$, and camera orientation (the orientation of the reference coordinate system to the camera coordinate system, in reality) is $\omega = [\omega_x\ \omega_y\ \omega_z]$. Note that $\omega$ is a 3-degree-of-freedom orientation expression, and orientation is represented with a rotation axial vector and rotation angle. If the rotation angle is $r_a$, then $r_a$ is represented with $\omega$ as shown in Expression (3).

$$r_a = \sqrt{\omega_x^2 + \omega_y^2 + \omega_z^2} \qquad (3)$$

Also, if the rotation axial vector is $r_{axis} = [r_x\, r_y\, r_z]^t$, the relationship between $r_{axis}$ and $\omega$ is represented as shown in Expression (4).

$$[\omega_x\, \omega_y\, \omega_z] = [r_a r_x\, r_a r_y\, r_a r_z] \qquad (4)$$

The relationship between $\omega$ (rotation angle $r_a$ and rotation axial vector $r_{axis}$) and 3×3 rotational transform matrix R is represented as shown in Expression (5).

$$R = \begin{bmatrix} R_{11} & R_{12} & R_{13} \\ R_{21} & R_{22} & R_{23} \\ R_{31} & R_{32} & R_{33} \end{bmatrix}$$

$$= \begin{bmatrix} r_x^2(1-\cos r_a)+\cos r_a & r_x r_y(1-\cos r_a)-r_z\sin r_a & r_z r_x(1-\cos r_a)+r_y\sin r_a \\ r_x r_y(1-\cos r_a)+r_z\sin r_a & r_y^2(1-\cos r_a)+\cos r_a & r_y r_z(1-\cos r_a)-r_x\sin r_a \\ r_z r_x(1-\cos r_a)-r_y\sin r_a & r_y r_z(1-\cos r_a)+r_x\sin r_a & r_z^2(1-\cos r_a)+\cos r_a \end{bmatrix}$$

(5)

The camera coordinate $x_c$ of a point $x_w = [x_w\, y_w\, z_w]^t$ on the reference coordinate system is represented with t and R as shown in Expression (6).

$$\begin{bmatrix} x_c \\ y_c \\ z_c \end{bmatrix} = R\begin{bmatrix} x_w - t_x \\ y_w - t_y \\ z_w - t_z \end{bmatrix} = \begin{bmatrix} R_{11} & R_{12} & R_{13} \\ R_{21} & R_{22} & R_{23} \\ R_{31} & R_{32} & R_{33} \end{bmatrix}\begin{bmatrix} x_w - t_x \\ y_w - t_y \\ z_w - t_z \end{bmatrix} \qquad (6)$$

According to Expressions (2) and (6), i.e., perspective projection transform, the point $x_w = [x_w\, y_w\, z_w]^t$ on the reference coordinate system is projected on the point $u = [u_x\, u_y]^t$ on the image as shown in Expression (7).

$$u_x = -f\frac{x_c}{z_c} = -f\frac{R_{11}(x_w - t_x) + R_{12}(y_w - t_y) + R_{13}(z_w - t_z)}{R_{31}(x_w - t_x) + R_{32}(y_w - t_y) + R_{33}(z_w - t_z)} \qquad (7)$$

$$u_y = -f\frac{y_c}{z_c} = -f\frac{R_{21}(x_w - t_x) + R_{22}(y_w - t_y) + R_{23}(z_w - t_z)}{R_{31}(x_w - t_x) + R_{32}(y_w - t_y) + R_{33}(z_w - t_z)}$$

Ideally, the projected position (calculated position) calculated from Expression (7) based on t, $\omega$, $x_w$ is identical to the position (observation position) to be observed. Accordingly, if we say that the error between the projected position and the observation position in the horizontal direction of the image is F, the error in the vertical direction is G, and the observation position is $u_o = [u_{ox}\, u_{oy}]^t$, F and G become zero as shown in Expression (8).

$$F = -f\frac{R_{11}(x_w - t_x) + R_{12}(y_w - t_y) + R_{13}(z_w - t_z)}{R_{31}(x_w - t_x) + R_{32}(y_w - t_y) + R_{33}(z_w - t_z)} - u_{ox} = 0 \qquad (8)$$

$$G = -f\frac{R_{21}(x_w - t_x) + R_{22}(y_w - t_y) + R_{23}(z_w - t_z)}{R_{31}(x_w - t_x) + R_{32}(y_w - t_y) + R_{33}(z_w - t_z)} - u_{oy} = 0$$

F and G are functions regarding the camera position t, camera orientation $\omega$, and position $x_w$ of the observation target point on the reference coordinates. Here, the position $x_w$ of the point on the reference coordinates becomes a different variable function depending on the types of markers, and whether to constrain markers on the plane, so F and G also become a different variable function depending on the types of markers, and whether to constrain markers on the plane. Description is made below by dividing into two cases, i.e., the case of constraining markers on the plane, and the case of not constraining markers on the plane.

(Case of Not Constraining Markers on the Plane)

In the case of point markers, if we say that the position of a point marker on the reference coordinate system is $t_{pn} = [t_{pnx}\, t_{pny}\, t_{pnz}]^t$, $x_w$ is identical with $t_{pn}$ as shown in Expression (9).

$$\begin{bmatrix} x_w \\ y_w \\ z_w \end{bmatrix} = \begin{bmatrix} t_{pnx} \\ t_{pny} \\ t_{pnz} \end{bmatrix} \qquad (9)$$

Accordingly, as shown in Expression (10), F and G become functions regarding the camera position t, camera orientation $\omega$, and position $t_{pn}$ of a point marker on the reference coordinate system.

$$F(t_x, t_y, t_z, \omega_x, \omega_y, \omega_z, t_{pnx}, t_{pny}, t_{pnz}) = 0$$

$$G(t_x, t_y, t_z, \omega_x, \omega_y, \omega_z, t_{pnx}, t_{pny}, t_{pnz}) = 0 \qquad (10)$$

Next, description is made regarding the case of square markers. Square markers are represented with the position $t_s = [t_{sx}\, t_{sy}\, t_{sz}]^t$ in the reference coordinate system and the orientation $\omega_s = [\omega_{sx}\, \omega_{sy}\, \omega_{sz}]$ as to the reference coordinate system (let us say that 3×3 rotational transform matrix corresponding to $\omega_s$ is $R_s$). Let us say that the position of vertices of a square marker in the square marker coordinate system is $x_s = [x_s\, y_s\, 0]^t$. The position $x_w$ of the vertices of a square marker in the reference coordinate system becomes a function regarding $t_s$ and $\omega_s$ ($R_s$) as shown in Expression (11).

$$\begin{bmatrix} x_w \\ y_w \\ z_w \\ 1 \end{bmatrix} = \begin{bmatrix} R_s & t_s \\ 0 & 1 \end{bmatrix}\begin{bmatrix} x_s \\ y_s \\ 0 \\ 1 \end{bmatrix} = \begin{bmatrix} R_{s11} & R_{s12} & R_{s13} & t_{sx} \\ R_{s21} & R_{s22} & R_{s23} & t_{sy} \\ R_{s31} & R_{s32} & R_{s33} & t_{sz} \\ 0 & 0 & 0 & 1 \end{bmatrix}\begin{bmatrix} x_s \\ y_s \\ 0 \\ 1 \end{bmatrix} \qquad (11)$$

Accordingly, as shown in Expression (12), F and G become functions regarding the camera position t, camera orientation $\omega$, position $t_p$ of a square marker, and orientation $\omega_s$ of a square marker.

$$F(t_x, t_y, t_z, \omega_x, \omega_y, \omega_z, t_{sx}, t_{sy}, t_{sz}, \omega_{sx}, \omega_{sy}, \omega_{sz}) = 0$$

$$G(t_x, t_y, t_z, \omega_x, \omega_y, \omega_z, t_{sx}, t_{sy}, t_{sz}, \omega_{sx}, \omega_{sy}, \omega_{sz}) = 0 \qquad (12)$$

(Case of Constraining Markers on the Plane)

Figure 8:
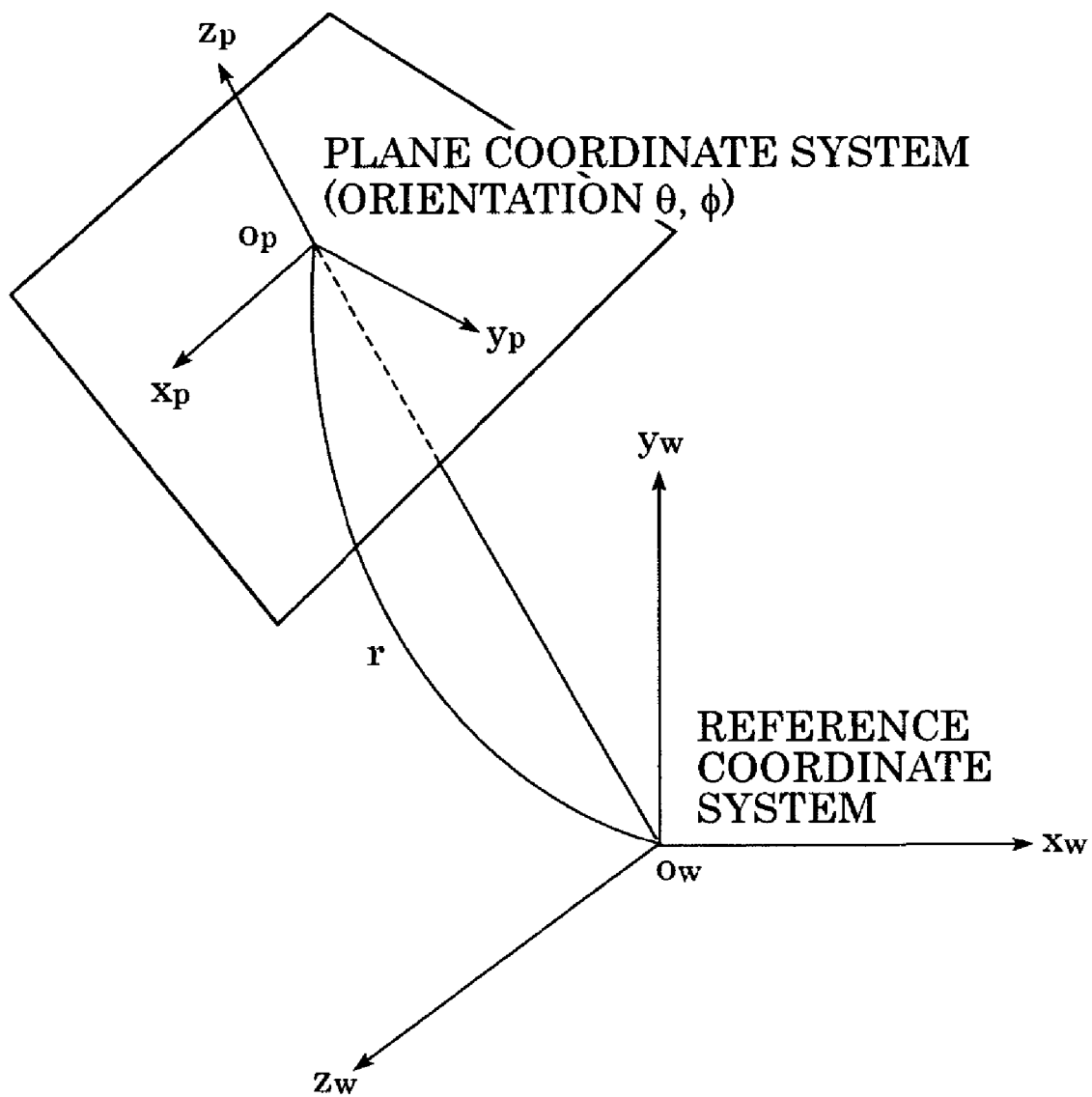
FIG. 8 is a diagram illustrating a plane definition method.

First, description is made regarding a method for defining a plane. As illustrated in FIG. 8, the plane is represented with polar coordinate expression $r=[r\ \theta\ \phi]$. The $z_p$ axis of the plane coordinate system is parallel to the normal line direction of the plane, and passes through the point of origin in the reference coordinate system. The orientation of the plane is defined with rotation $\theta$ around the y axis and rotation $\phi$ around the x axis. Also, r is a signed distance between the plane and the origin $o_w$ of the reference coordinate system. The rotation matrix $R_p$ representing the orientation of the plane is represented as shown in Expression (13).

$$R_p = \begin{bmatrix} R_{p11} & R_{p12} & R_{p13} \\ R_{p21} & R_{p22} & R_{p23} \\ R_{p31} & R_{p32} & R_{p33} \end{bmatrix} \quad (13)$$

$$= \begin{bmatrix} 1 & 0 & 0 \\ 0 & \cos\phi & -\sin\phi \\ 0 & \sin\phi & \cos\phi \end{bmatrix} \begin{bmatrix} \cos\theta & 0 & \sin\theta \\ 0 & 1 & 0 \\ -\sin\theta & 0 & \cos\theta \end{bmatrix}$$

$$= \begin{bmatrix} \cos\theta & 0 & \sin\theta \\ \sin\theta\sin\phi & \cos\phi & -\cos\theta\sin\phi \\ -\sin\theta\cos\phi & \sin\phi & \cos\theta\cos\phi \end{bmatrix}$$

Also, the position $t_{pl}=[t_{plx}\ t_{ply}\ t_{plz}]^t$ of the point of origin $o_p$ of the plane coordinate system in the reference coordinate system is obtained as an intersecting point between the $z_p$ axis and the plane as shown in Expression (14).

Note that $\vec{n}$ represents the normal line vector of the plane.

$$t_{pl} = \begin{bmatrix} t_{plx} \\ t_{ply} \\ t_{plz} \end{bmatrix} = r \cdot \vec{n} = r \cdot \begin{bmatrix} R_{p11} & R_{p12} & R_{p13} \\ R_{p21} & R_{p22} & R_{p23} \\ R_{p31} & R_{p32} & R_{p33} \end{bmatrix} \begin{bmatrix} 0 \\ 0 \\ 1 \end{bmatrix} \quad (14)$$

$$= \begin{bmatrix} r\sin\theta \\ -r\cos\theta\sin\phi \\ r\cos\theta\cos\phi \end{bmatrix}$$

The position $x_w$ of the point $x_p=[x_p\ y_p\ 0]^t$ on the plane coordinate system in the reference coordinate system represented with the aforementioned polar coordinate expression $r=[r\ \theta\ \phi]$ is represented as shown in Expression (15). As can be understood from Expression (15), $x_w$ and $x_p$ are functions of r.

$$x_w = \begin{bmatrix} x_w \\ y_w \\ z_w \end{bmatrix} = \begin{bmatrix} R_{p11} & R_{p12} & t_{plx} \\ R_{p21} & R_{p22} & t_{ply} \\ R_{p31} & R_{p32} & t_{plz} \end{bmatrix} \begin{bmatrix} x_p \\ y_p \\ 1 \end{bmatrix} \quad (15)$$

$$= \begin{bmatrix} x_p\cos\theta + r\sin\theta \\ x_p\sin\theta\sin\phi + y_p\cos\phi - r\cos\theta\sin\phi \\ -x_p\sin\theta\cos\phi + y_p\sin\phi + r\cos\theta\cos\phi \end{bmatrix}$$

The point marker constrained on the plane is represented with the position $t^{pl}_p=[t^{pl}_{px}\ t^{pl}_{py}\ 0]^t$. As shown in Expression (16), $x_p$ is identical with $t^{pl}_p$.

$$\begin{bmatrix} x_p \\ y_p \\ 0 \end{bmatrix} = \begin{bmatrix} t^{pl}_{px} \\ t^{pl}_{py} \\ 0 \end{bmatrix} \quad (16)$$

Accordingly, $x_w$ is a function of $t^{pl}_p$ and r, and F and G become functions of the camera position t, camera orientation $\omega$, position $t^{pl}_p$ of the point marker on the plane, and parameter r of the plane, as in Expression (17).

$$F(t_x,t_y,t_z,\omega_x,\omega_y,\omega_z,t^{pl}_{px},t^{pl}_{py},r,\theta,\phi)=0$$

$$G(t_x,t_y,t_z,\omega_x,\omega_y,\omega_z,t^{pl}_{px},t^{pl}_{py},r,\theta,\phi)=0 \quad (17)$$

On the other hand, in the case of square markers, in addition to the position $t^{pl}_s=[t^{pl}_{sx}\ t^{pl}_{sy}\ 0]^t$ on the plane coordinate system, the square marker constrained on the plane is represented with the rotation $\theta^{pl}$ around the normal line vector of the square marker (i.e., around the $z_p$ axis of the plane coordinate system). So, if we say that the position of the vertices of the square marker in the square marker coordinate system is $x_s=[x_s\ y_s\ 0]^t$, the plane coordinate $x_p$ thereof is represented as shown in Expression (18).

$$\begin{bmatrix} x_p \\ y_p \\ 1 \end{bmatrix} = \begin{bmatrix} \cos\theta^{pl} & -\sin\theta^{pl} & t^{pl}_{sx} \\ \sin\theta^{pl} & \cos\theta^{pl} & t^{pl}_{sx} \\ 0 & 0 & 1 \end{bmatrix} \begin{bmatrix} x_s \\ y_s \\ 1 \end{bmatrix} \quad (18)$$

Thus, $x_w$ is a function of $t^{pl}_s$, $\theta^{pl}$, and r, and F and G become functions of the camera position t, camera orientation $\omega$, position $t^{pl}_s$ of the square marker on the plane, orientation $\theta^{pl}$ of the square marker on the plane, and parameter r of the plane, as in Expression (19).

$$F(t_x,t_y,t_z,\omega_x,\omega_y,\omega_z,t^{pl}_{sx},t^{pl}_{sy},\theta^{pl},r,\theta,\phi)=0$$

$$G(t_x,t_y,t_z,\omega_x,\omega_y,\omega_z,t^{pl}_{sx},t^{pl}_{sy},\theta^{pl},r,\theta,\phi)=0 \quad (19)$$

Expressions (10), (12), (17), and (19) are nonlinear expressions regarding the camera position and orientation, position and orientation of the marker, and the plane parameter. Accordingly, linearization is performed in the vicinity of the approximate values regarding the position and orientation of the camera, the position and orientation of the marker, and the plane parameters using the Taylor expansion up to first order, and the position and orientation of the camera, the position and orientation of the marker, and the plane parameters are obtained using repeated calculation.

Expressions (20), (21), (22), and (23) are obtained by linearizing the corresponding Expressions (10), (12), (17), and (19) respectively. Here, $\Delta t_x$, $\Delta t_y$, and $\Delta t_z$ represent the correction value for the approximate values of the position of the camera; $\Delta\omega_x$, $\Delta\omega_y$, and $\Delta\omega_z$ for the orientation of the camera; $\Delta t_{px}$, $\Delta t_{py}$, and $\Delta t_{pz}$ for the position of the point marker not constrained to the plane; $\Delta t_{sx}$, $\Delta t_{sy}$, and $\Delta t_{sz}$ for the position of the square marker not constrained to the plane; $\Delta\omega_{sx}$, $\Delta\omega_{sy}$, and $\Delta\omega_{sz}$ for the orientation of the square marker not constrained to the plane; $\Delta t^{pl}_{px}$ and $\Delta t^{pl}_{py}$ for the position on the plane of the point marker constrained to the plane; $\Delta t^{pl}_{sx}$ and $\Delta t^{pl}_{sy}$ for the position on the plane of the square marker constrained to the plane; $\Delta\theta^{pl}$ for the orientation on the plane of the square marker constrained with the plane; and $\Delta r$, $\Delta\theta$, and $\Delta\phi$ for the correction value as to the approximate values of the plane parameters.

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta \omega_x + \frac{\partial F}{\partial \omega_y}\Delta \omega_y + \qquad (20)$$
$$\frac{\partial F}{\partial \omega_z}\Delta \omega_z + \frac{\partial F}{\partial t_{px}}\Delta t_{px} + \frac{\partial F}{\partial t_{py}}\Delta t_{py} + \frac{\partial F}{\partial t_{pz}}\Delta t_{pz} = 0$$

$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x + \frac{\partial G}{\partial \omega_y}\Delta \omega_y +$$
$$\frac{\partial G}{\partial \omega_z}\Delta \omega_z + \frac{\partial G}{\partial t_{px}}\Delta t_{px} + \frac{\partial G}{\partial t_{py}}\Delta t_{py} + \frac{\partial G}{\partial t_{pz}}\Delta t_{pz} = 0$$

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta \omega_x + \qquad (21)$$
$$\frac{\partial F}{\partial \omega_y}\Delta \omega_y + \frac{\partial F}{\partial \omega_z}\Delta \omega_z + \frac{\partial F}{\partial t_{sx}}\Delta t_{sx} + \frac{\partial F}{\partial t_{sy}}\Delta t_{sy} +$$
$$\frac{\partial F}{\partial t_{sz}}\Delta t_{sz} + \frac{\partial F}{\partial \omega_{sx}}\Delta \omega_{sx} + \frac{\partial F}{\partial \omega_{sy}}\Delta \omega_{sy} + \frac{\partial F}{\partial \omega_{sz}}\Delta \omega_{sz} = 0$$

$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x +$$
$$\frac{\partial G}{\partial \omega_y}\Delta \omega_y + \frac{\partial G}{\partial \omega_z}\Delta \omega_z + \frac{\partial G}{\partial t_{sx}}\Delta t_{sx} + \frac{\partial G}{\partial t_{sy}}\Delta t_{sy} +$$
$$\frac{\partial G}{\partial t_{sz}}\Delta t_{sz} + \frac{\partial G}{\partial \omega_{sx}}\Delta \omega_{sx} + \frac{\partial G}{\partial \omega_{sy}}\Delta \omega_{sy} + \frac{\partial G}{\partial \omega_{sz}}\Delta \omega_{sz} = 0$$

$$F^0 + \frac{\partial F}{\partial t_x}\Delta t_x + \frac{\partial F}{\partial t_y}\Delta t_y + \frac{\partial F}{\partial t_z}\Delta t_z + \qquad (22)$$
$$\frac{\partial F}{\partial \omega_x}\Delta \omega_x + \frac{\partial F}{\partial \omega_y}\Delta \omega_y + \frac{\partial F}{\partial \omega_z}\Delta \omega_z + \frac{\partial F}{\partial t_{px}^{pl}}\Delta t_{px}^{pl} +$$
$$\frac{\partial F}{\partial t_{py}^{pl}}\Delta t_{py}^{pl} + \frac{\partial F}{\partial r}\Delta r + \frac{\partial F}{\partial \theta}\Delta \theta + \frac{\partial F}{\partial \phi}\Delta \phi = 0$$

$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x + \frac{\partial G}{\partial \omega_y}\Delta \omega_y +$$
$$\frac{\partial G}{\partial \omega_z}\Delta \omega_z + \frac{\partial G}{\partial t_{px}^{pl}}\Delta t_{px}^{pl} + \frac{\partial G}{\partial t_{py}^{pl}}\Delta t_{py}^{pl} + \frac{\partial G}{\partial r}\Delta r + \frac{\partial G}{\partial \theta}\Delta \theta + \frac{\partial G}{\partial \phi}\Delta \phi = 0$$

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta \omega_x + \qquad (23)$$
$$\frac{\partial F}{\partial \omega_y}\Delta \omega_y + \frac{\partial F}{\partial \omega_z}\Delta \omega_z + \frac{\partial F}{\partial t_{sx}^{pl}}\Delta t_x^{pl} + \frac{\partial F}{\partial t_{sy}^{pl}}\Delta t_y^{pl} +$$
$$\frac{\partial F}{\partial \theta^{pl}}\Delta \theta^{pl} + \frac{\partial F}{\partial r}\Delta r + \frac{\partial F}{\partial \theta}\Delta \theta + \frac{\partial F}{\partial \phi}\Delta \phi = 0$$

$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x + \frac{\partial G}{\partial \omega_y}\Delta \omega_y + \frac{\partial G}{\partial \omega_z}\Delta \omega_z +$$
$$\frac{\partial G}{\partial t_{sx}^{pl}}\Delta t_{sx}^{pl} + \frac{\partial G}{\partial t_{sy}^{pl}}\Delta t_{sy}^{pl} + \frac{\partial G}{\partial \theta^{pl}}\Delta \theta^{pl} + \frac{\partial G}{\partial r}\Delta r + \frac{\partial G}{\partial \theta}\Delta \theta + \frac{\partial G}{\partial \phi}\Delta \phi = 0$$

Here, $F^0$ and $G^0$ in Expressions (20), (21), (22), and (23) are constants, and represent the difference between the observed position $u_o$ and the projected position (calculated position) of the marker obtained from the approximate values regarding the position and orientation of the camera, the position of the point marker or the position and orientation of the square marker, and the plane parameters.

Expressions (20), (21), (22), and (23) are observation equations regarding one point marker or one vertex of a square marker observed on a certain image. In reality, multiple point markers or multiple square markers are observed on multiple images, so multiple Expressions (20), (21), (22), and (23) are obtained. Accordingly, the positions and orientations of the cameras, the positions of the point markers not constrained on the plane, the positions and orientations of the square markers not constrained on the plane, the positions of the point markers constrained on the plane, the positions and orientations of the square markers constrained on the plane, and the plane parameters are obtained by solving multiple Expressions (20), (21), (22), and (23) as simultaneous equations regarding the correction values as to the approximate values regarding the positions and orientations of the cameras, the positions of the point markers not constrained on the plane, the positions and orientations of the square markers not constrained on the plane, the positions of the point markers constrained on the plane, the positions and orientations of the square markers constrained on the plane, and the plane parameters.

Figure 9:
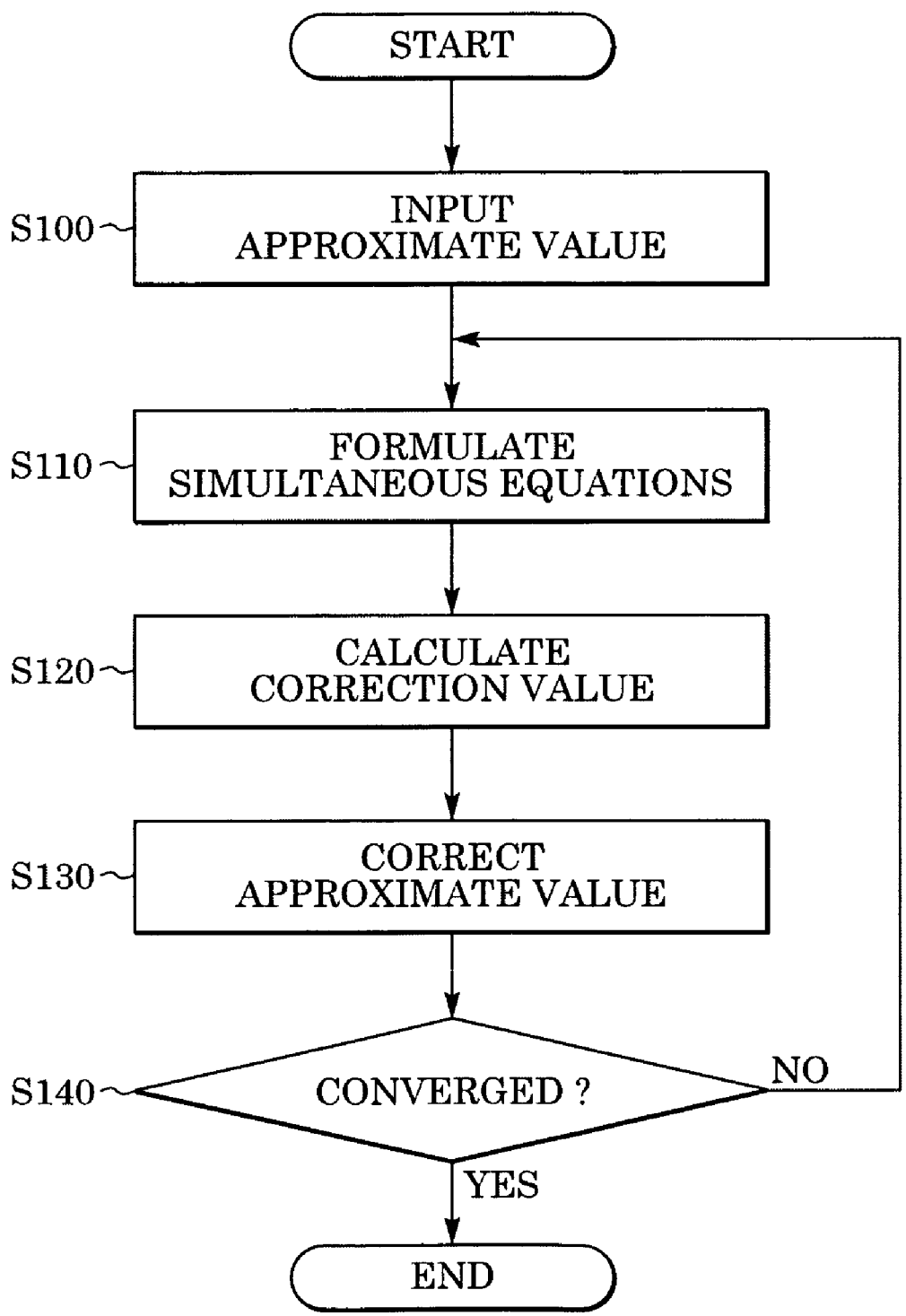
FIG. 9 is a flowchart illustrating procedures for obtaining the positions of point markers, and the positions and orientations of square markers, according to the first embodiment.

FIG. 9 is a flowchart illustrating procedures for obtaining the positions of point markers, and the positions and orientations of square markers according to the present embodiment. Now, let us say that photographing of scenes including markers and extraction and identification of the markers from photographed images have been completed. In Step S100, the approximate values regarding the positions and orientations of the cameras taking each image, the positions of the point markers, the positions and orientations of the square markers, and the plane parameters are set. In the subsequent steps, correction values for correcting the approximate values set in Step S100 are obtained. In Step S110, formulation of simultaneous equations for simultaneously obtaining the correction value of each approximate value is performed so as to minimize the projection error based on the approximate values regarding the positions and orientations of the cameras, the positions of the point markers, the positions and orientations of the square markers, and the plane parameters. In Step S120, the correction value of each approximate value is obtained from the simultaneous equations formulated in Step S110. In Step S130, new approximate values are obtained by correcting each approximate value with the corresponding correction value obtained in Step S120. In Step S140, determination is made as to whether or not the approximate values regarding the positions and orientations of the cameras, the positions of the point markers, the positions and orientations of the square markers, and the plane parameters are converged to the optimized value in Step S130. If so, processing ends. If not, processing returns to Step S110 and steps S110-S140 are repeated. More specific descriptions regarding each step are provided below.

In Step S100, the approximate values regarding the position and orientation of the camera taking the images, the positions of the point markers, the positions and orientations of the square markers, and the plane parameters are input. Here, let us say that the number of images taken is N, the positions of the camera taking each image are $t_i=[t_{ix}\ t_{iy}\ t_{iz}]^t$ (i=1, and so on through N), and the orientations thereof are $\omega_i=[\omega_{ix}\ \omega_{iy}\ \omega_{iz}]$ (i=1, and so on through N). Also, of the point markers of which the positions need to be obtained, let us say that the number of the point markers not constrained on the plane is $K_{p1}$, the number of the point markers constrained on the plane is $K_{p2}$, and the positions of the respective point markers are $t_{pi}=[t_{pix}\ t_{piy}\ t_{piz}]^t$ (i=1, and so on through $K_{p1}$), $t^{pl}_{pi}=[t^{pl}_{pix}\ t^{pl}_{piy}]t$ (i=1, and so on through $K_{p2}$). Further, of the square markers of which the positions and orientations need to be obtained, let us say that the number of the square markers not constrained on the plane is $K_{s1}$, the number of the square markers constrained on the plane is $K_{s2}$, and the positions of the respective square markers are $t_{si}=[t_{six}\ t_{siy}\ t_{siz}]^t$ (i=1, and so on through $K_{s1}$), $t^{pl}_{si}=[t^{pl}_{six}\ t^{pl}_{siy}]t$ (i=1, and so on through $K_{s2}$), and the orientations thereof are $\omega_{si}=[\omega_{six}\ \omega_{siy}\ \omega_{siz}]$ (i=1, and so on through $K_{s1}$), $\theta^{pl}_i$(i=1, and so on through $K_{s2}$)

The approximate values of the position and orientation of each camera may be obtained from the output value of a 6-degree-of-freedom position and orientation sensor such as a magnetic sensor, which is mounted on the camera, or may be obtained from the correspondence between points of which the positions in the reference coordinate system are known, and the projected position of the point on the image. In the case of employing a point of which the position in the reference coordinate system is known, both the point of which the position is known, and markers of which the positions to be obtained are unknown are mixed in the scene. Alternately, the approximate values of the position and orientation of each camera may be obtained based on the later-described approximate values of the position and orientation of a marker.

Alternately, the approximate values of the position and orientation of each camera may be obtained mechanically, for example, with a motion control camera, or photographing with a camera of which the position and orientation have been calibrated beforehand may be performed so as to employ the calibration results.

The approximate values of the position and orientation of each marker may be a rough value measured by hand using a measuring tape, ruler, protractor, or surveying instrument, or may be a value estimated once using the method according to the present embodiment or the like. The approximate values of the position and orientation of each marker constrained on the plane may be the values of the position and orientation of the marker in the plane coordinate system.

In the event that the markers on the same plane are all point markers, the approximate values of the plane parameters may be obtained by obtaining a regression plane from the approximate value of the position of each point marker. On the other hand, in the event that the markers on the same plane include the square markers, the approximate values of the plane parameters may be obtained from the position and orientation of each square marker by assuming that each square marker is the plane. Further, the user may specify the plane parameters directly without obtaining the plane parameters from the approximate values of the position and orientation of each marker.

Next, in Step S110, observation equations of Expressions (20), (21), (22), and (23) are formulated of a number corresponding to the number of the markers to be observed on the image. Expressions (20), (21), (22), and (23) are observation equations regarding the correction values of the position and orientation of one camera, the correction value of the position of one point marker or the correction values of the position and orientation of one square marker, and the correction value of one plane parameter. Here, as shown in Expression (24), an observation equation regarding the positions and orientations of N cameras, the positions of $K_{p1}$ point markers not constrained on the plane, the positions of $K_{p2}$ point markers constrained on the plane, the positions of $K_{s1}$ square markers not constrained on the plane, the positions of $K_{s2}$ square markers constrained on the plane, and P plane parameters is formulated. In this case, the number of unknown correction values is $(6 \times N + 3 \times K_{p1} + 2 \times K_{p2} + 6 \times K_{s1} + 3 \times K_{s2} + 3 \times P)$.

$$F^0 + \sum_{i=1}^{N} \left( \frac{\partial F}{\partial t_{ix}} \Delta t_{ix} + \frac{\partial F}{\partial t_{iy}} \Delta t_{iy} + \frac{\partial F}{\partial t_{iz}} \Delta t_{iz} + \frac{\partial F}{\partial \omega_{ix}} \Delta \omega_{ix} + \frac{\partial F}{\partial \omega_{iy}} \Delta \omega_{iy} + \frac{\partial F}{\partial \omega_{iz}} \Delta \omega_{iz} \right) + \sum_{i=1}^{K_{p1}} \left( \frac{\partial F}{\partial t_{pix}} \Delta t_{pix} + \frac{\partial F}{\partial t_{piy}} \Delta t_{piy} + \frac{\partial F}{\partial t_{piz}} \Delta t_{piz} \right) + \qquad (24)$$

-continued $$\sum_{i=1}^{K_{s1}} \left( \frac{\partial F}{\partial t_{six}} \Delta t_{six} + \frac{\partial F}{\partial t_{siy}} \Delta t_{siy} + \frac{\partial F}{\partial t_{siz}} \Delta t_{siz} + \frac{\partial F}{\partial \omega_{six}} \Delta \omega_{six} + \frac{\partial F}{\partial \omega_{siy}} \Delta \omega_{siy} + \frac{\partial F}{\partial \omega_{siz}} \Delta \omega_{siz} \right) +$$

$$\sum_{i=1}^{K_{p2}} \left( \frac{\partial F}{\partial t_{pix}^{pl}} \Delta t_{pix}^{pl} + \frac{\partial F}{\partial t_{piy}^{pl}} \Delta t_{piy}^{pl} \right) +$$

$$\sum_{i=1}^{K_{s2}} \left( \frac{\partial F}{\partial t_{six}^{pl}} \Delta t_{six}^{pl} + \frac{\partial F}{\partial t_{siy}^{pl}} \Delta t_{siy}^{pl} + \frac{\partial F}{\partial \theta^{pl}} \Delta \theta^{pl} \right) +$$

$$\sum_{i=1}^{P} \left( \frac{\partial F}{\partial r} \Delta r + \frac{\partial F}{\partial \theta} \Delta \theta + \frac{\partial F}{\partial \phi} \Delta \phi \right) = 0$$

$$G^0 + \sum_{i=1}^{N} \left( \frac{\partial G}{\partial t_{ix}} \Delta t_{ix} + \frac{\partial G}{\partial t_{iy}} \Delta t_{iy} + \frac{\partial G}{\partial t_{iz}} \Delta t_{iz} + \frac{\partial G}{\partial \omega_{ix}} \Delta \omega_{ix} + \frac{\partial G}{\partial \omega_{iy}} \Delta \omega_{iy} + \frac{\partial G}{\partial \omega_{iz}} \Delta \omega_{iz} \right) +$$

$$\sum_{i=1}^{K_{p1}} \left( \frac{\partial G}{\partial t_{pix}} \Delta t_{pix} + \frac{\partial G}{\partial t_{piy}} \Delta t_{piy} + \frac{\partial G}{\partial t_{piz}} \Delta t_{piz} \right) +$$

$$\sum_{i=1}^{K_{s1}} \left( \frac{\partial G}{\partial t_{six}} \Delta t_{six} + \frac{\partial G}{\partial t_{siy}} \Delta t_{siy} + \frac{\partial G}{\partial t_{siz}} \Delta t_{siz} + \frac{\partial G}{\partial \omega_{six}} \Delta \omega_{six} + \frac{\partial G}{\partial \omega_{siy}} \Delta \omega_{siy} + \frac{\partial G}{\partial \omega_{siz}} \Delta \omega_{siz} \right) +$$

$$\sum_{i=1}^{K_{p2}} \left( \frac{\partial G}{\partial t_{pix}^{pl}} \Delta t_{pix}^{pl} + \frac{\partial G}{\partial t_{piy}^{pl}} \Delta t_{piy}^{pl} \right) +$$

$$\sum_{i=1}^{K_{s2}} \left( \frac{\partial G}{\partial t_{six}^{pl}} \Delta t_{six}^{pl} + \frac{\partial G}{\partial t_{siy}^{pl}} \Delta t_{siy}^{pl} + \frac{\partial G}{\partial \theta^{pl}} \Delta \theta^{pl} \right) +$$

$$\sum_{i=1}^{P} \left( \frac{\partial G}{\partial r} \Delta r + \frac{\partial G}{\partial \theta} \Delta \theta + \frac{\partial G}{\partial \phi} \Delta \phi \right) = 0$$

If we say that the number of point markers to be detected from an image i (i=1, and so on through N) is $d_{pi}$, and the number of square markers is $d_{si}$, the number $D_p$ of the point markers to be detected from the N images and the number $D_s$ of the square markers to be detected from the N images are represented as shown in Expression (25).

$$D_p = \sum_{i=1}^{N} d_{pi} \qquad (25)$$

$$D_s = \sum_{i=1}^{N} d_{si}$$

In the case in which the number of the point markers to be detected from the N images is $D_p$, and the number of the square markers to be detected from the N images is $D_s$, $(D_p + 4 \times D_s)$ sets of observation equation (24), i.e., $2 \times (D_p + 4 \times D_s)$ observation equations are formulated. If simultaneous equations are formulated by transposing the constant terms $F^0$ and $G^0$ on the left side of the Expression (24) to the right side thereof, the simultaneous equations are written in a matrix format as shown in Expression (26).

$$J \cdot \Delta = E \qquad (26)$$

J is called a "Jacobian matrix" in which partial differential coefficients regarding the position and orientation of a camera, the position of a point marker, the position and orientation of a square marker, and a plane parameter, of F and G are arrayed. The number of rows of the Jacobian matrix J is the number of the observation equations, i.e., $2 \times (D_p + 4 \times D_s)$, the number of columns thereof is the number of unknowns, i.e., $(6 \times N + 3 \times K_{p1} + 2 \times K_{p2} + 6 \times K_{s1} + 3 \times K_{s2} + 3 \times P)$. $\Delta$ represents a correction vector. The size of the correction vector is the number of unknowns, i.e., $(6 \times N + 3 \times K_{p1} + 2 \times K_{p2} + 6 \times K_{s1} + 3 \times K_{s2} + 3 \times P)$. E represents an error vector, and has $-F_0$ and $-G_0$ which are the differences between the calculated position of the projected position due to the approximate value and the observed position. The size of E is the number of the observation equations, i.e., $2 \times (D_p + 4 \times D_s)$ Note that the origin, scale, and orientation of the reference coordinate system can be clearly specified by photographing point markers of which the positions are known or square markers of which the positions and orientations are known in the reference coordinate system simultaneously. In Expression (24), the partial differential coefficients regarding the positions and orientations of these markers become zero. In order to clearly specify the origin, scale, and orientation of the reference coordinate system, three point markers, of which the positions are known, need to be employed in the case of point markers, or one square marker of which the position and orientation are known needs to be employed in the case of square markers.

Next, in Step S120, the correction values as to the approximate values regarding the positions and orientations of the cameras, the positions of the point markers, the positions and orientations of the square markers, and the plane parameters, are obtained using Expression (26). In the case that the Jacobian matrix J is a square matrix, the correction value vector $\Delta$ is obtained by multiplying both sides of Expression (26) by the inverse matrix of the matrix J. In the case that the matrix J is not a square matrix, the correction value vector $\Delta$ is obtained using the least mean square method, as shown in Expression (27).

$$\Delta = (J^t \cdot J)^{-1} J^t \cdot E \qquad (27)$$

Next, description is made regarding a method for obtaining each factor of the Jacobian matrix J. First, definition is made that $F = [F \ G]^t$. From Expressions (7) and (8), F and G can be written as shown in Expression (28), so F and G are functions of $x_c$, $y_c$, and $z_c$.

$$F = -f \frac{x_c}{z_c} - u_{ox} \qquad (28)$$
$$G = -f \frac{y_c}{z_c} - u_{oy}$$

The Jacobian matrix $J_{Fx_c}$ of which each factor has a partial differential coefficient according to $x_c$, $y_c$, and $z_c$ of F and G, can be written as shown in Expression (29).

$$J_{Fx_c} = \begin{bmatrix} \frac{\partial F}{\partial x_c} & \frac{\partial F}{\partial y_c} & \frac{\partial F}{\partial z_c} \\ \frac{\partial G}{\partial x_c} & \frac{\partial G}{\partial y_c} & \frac{\partial G}{\partial z_c} \end{bmatrix} = \begin{bmatrix} -\frac{f}{z_c} & 0 & \frac{fx_c}{z_c^2} \\ 0 & -\frac{f}{z_c} & \frac{fy_c}{z_c^2} \end{bmatrix} \qquad (29)$$

Here, if $x_c$, $y_c$, $z_c$ are the functions of variables $S_1$, $S_2$, and so on through $S_m$, then F and G are also the functions of the variables $S_1$, $S_2$, and so on through $S_m$. The Jacobian matrix $J_{Fs}$ of which each factor has a partial differential coefficient according to $S_1$, $S_2$, and so on through $S_m$ of F and G, can be decomposed as shown in Expression (30).

$$J_{Fs} = \begin{bmatrix} \frac{\partial F}{\partial s_1} & \frac{\partial F}{\partial s_2} & \cdots & \frac{\partial F}{\partial s_m} \\ \frac{\partial G}{\partial s_1} & \frac{\partial G}{\partial s_2} & \cdots & \frac{\partial G}{\partial s_m} \end{bmatrix} \qquad (30)$$

$$= J_{Fx_c} \cdot J_{x_c s}$$

$$= \begin{bmatrix} \frac{\partial F}{\partial x_c} & \frac{\partial F}{\partial y_c} & \frac{\partial F}{\partial z_c} \\ \frac{\partial G}{\partial x_c} & \frac{\partial G}{\partial y_c} & \frac{\partial G}{\partial z_c} \end{bmatrix} \begin{bmatrix} \frac{\partial x_c}{\partial s_1} & \frac{\partial x_c}{\partial s_2} & \cdots & \frac{\partial x_c}{\partial s_m} \\ \frac{\partial y_c}{\partial s_1} & \frac{\partial y_c}{\partial s_2} & \cdots & \frac{\partial y_c}{\partial s_m} \\ \frac{\partial z_c}{\partial s_1} & \frac{\partial z_c}{\partial s_2} & \cdots & \frac{\partial z_c}{\partial s_m} \end{bmatrix}$$

By substituting s with the camera position, camera orientation, marker position, marker orientation, and plane parameters, the partial differential coefficients regarding the camera position, camera orientation, marker position, marker orientation, and plane parameters, of F and G can be obtained.

The Jacobian matrix $J_{Ft}$ of which each factor has a partial differential coefficient according to the camera position $t_x$, $t_y$, and $t_z$ of F and G can be written as shown in Expression (31).

$$J_{Ft} = J_{Fx_c} \cdot J_{x_c t} = J_{Fx_c} \cdot \begin{bmatrix} \frac{\partial x_c}{\partial t_x} & \frac{\partial x_c}{\partial t_y} & \frac{\partial x_c}{\partial t_z} \\ \frac{\partial y_c}{\partial t_x} & \frac{\partial y_c}{\partial t_y} & \frac{\partial y_c}{\partial t_z} \\ \frac{\partial z_c}{\partial t_x} & \frac{\partial z_c}{\partial t_y} & \frac{\partial z_c}{\partial t_z} \end{bmatrix} \qquad (31)$$

$$= J_{Fx_c} \cdot \begin{bmatrix} -R_{11} & -R_{12} & -R_{13} \\ -R_{21} & -R_{22} & -R_{23} \\ -R_{31} & -R_{32} & -R_{33} \end{bmatrix}$$

Note that the relationship between the orientation $\omega$ and $3 \times 3$ rotation transform matrix R is as represented in Expression (5).

The Jacobian matrix $J_{F\omega}$ of which each factor has a partial differential coefficient according to the camera orientations $\omega_x$, $\omega_y$, and $\omega_z$ of F and G can be written in a decomposed manner as shown in Expression (32).

$$J_{F\omega} = J_{Fx_c} \cdot J_{x_c \omega} = J_{Fx_c} \cdot J_{x_c R} \cdot J_{R\omega} = J_{Fx_c} \cdot J_{x_c R} \cdot J_{Rr_{axis}} \cdot J_{r_{axis}\omega} = J_{F\omega} \qquad (32)$$

Here, $J_{x_c R}$ is the Jacobian matrix as shown in Expression (33).

$$J_{x_cR} = \begin{bmatrix} \frac{\partial x_c}{\partial R_{11}} & \frac{\partial x_c}{\partial R_{21}} & \frac{\partial x_c}{\partial R_{31}} & \frac{\partial x_c}{\partial R_{12}} & \frac{\partial x_c}{\partial R_{22}} & \frac{\partial x_c}{\partial R_{32}} & \frac{\partial x_c}{\partial R_{13}} & \frac{\partial x_c}{\partial R_{23}} & \frac{\partial x_c}{\partial R_{33}} \\ \frac{\partial y_c}{\partial R_{11}} & \frac{\partial y_c}{\partial R_{21}} & \frac{\partial y_c}{\partial R_{31}} & \frac{\partial y_c}{\partial R_{12}} & \frac{\partial y_c}{\partial R_{22}} & \frac{\partial y_c}{\partial R_{32}} & \frac{\partial y_c}{\partial R_{13}} & \frac{\partial y_c}{\partial R_{23}} & \frac{\partial y_c}{\partial R_{33}} \\ \frac{\partial z_c}{\partial R_{11}} & \frac{\partial z_c}{\partial R_{21}} & \frac{\partial z_c}{\partial R_{31}} & \frac{\partial z_c}{\partial R_{12}} & \frac{\partial z_c}{\partial R_{22}} & \frac{\partial z_c}{\partial R_{32}} & \frac{\partial z_c}{\partial R_{13}} & \frac{\partial z_c}{\partial R_{23}} & \frac{\partial z_c}{\partial R_{33}} \end{bmatrix}$$

$$= \begin{bmatrix} x_w - t_x & 0 & 0 & y_w - t_y & 0 & 0 & z_w - t_z & 0 & 0 \\ 0 & x_w - t_x & 0 & 0 & y_w - t_y & 0 & 0 & z_w - t_z & 0 \\ 0 & 0 & x_w - t_x & 0 & 0 & y_w - t_y & 0 & 0 & z_w - t_z \end{bmatrix} \quad (33)$$

Also, $J_{Rr_{axis}}$ is the Jacobian matrix as shown in Expression (34).

$$J_{Rr_{axis}} = \begin{bmatrix} \frac{\partial R_{11}}{\partial r_x} & \frac{\partial R_{11}}{\partial r_y} & \frac{\partial R_{11}}{\partial r_z} & \frac{\partial R_{11}}{\partial r_a} \\ \frac{\partial R_{21}}{\partial r_x} & \frac{\partial R_{21}}{\partial r_y} & \frac{\partial R_{21}}{\partial r_z} & \frac{\partial R_{21}}{\partial r_a} \\ \frac{\partial R_{31}}{\partial r_x} & \frac{\partial R_{31}}{\partial r_y} & \frac{\partial R_{31}}{\partial r_z} & \frac{\partial R_{31}}{\partial r_a} \\ \frac{\partial R_{12}}{\partial r_x} & \frac{\partial R_{12}}{\partial r_y} & \frac{\partial R_{12}}{\partial r_z} & \frac{\partial R_{12}}{\partial r_a} \\ \frac{\partial R_{22}}{\partial r_x} & \frac{\partial R_{22}}{\partial r_y} & \frac{\partial R_{22}}{\partial r_z} & \frac{\partial R_{22}}{\partial r_a} \\ \frac{\partial R_{32}}{\partial r_x} & \frac{\partial R_{32}}{\partial r_y} & \frac{\partial R_{32}}{\partial r_z} & \frac{\partial R_{32}}{\partial r_a} \\ \frac{\partial R_{13}}{\partial r_x} & \frac{\partial R_{13}}{\partial r_y} & \frac{\partial R_{13}}{\partial r_z} & \frac{\partial R_{13}}{\partial r_a} \\ \frac{\partial R_{23}}{\partial r_x} & \frac{\partial R_{23}}{\partial r_y} & \frac{\partial R_{23}}{\partial r_z} & \frac{\partial R_{23}}{\partial r_a} \\ \frac{\partial R_{33}}{\partial r_x} & \frac{\partial R_{33}}{\partial r_y} & \frac{\partial R_{33}}{\partial r_z} & \frac{\partial R_{33}}{\partial r_a} \end{bmatrix}$$

$$= \begin{bmatrix} 2r_x(1-\cos r_a) & 0 & 0 & (r_x^2-1)\sin r_a \\ r_y(1-\cos r_a) & r_x(1-\cos r_a) & \sin r_a & r_x r_y \sin r_a + r_z \cos r_a \\ r_z(1-\cos r_a) & -\sin r_a & r_x(1-\cos r_a) & r_z r_x \sin r_a - r_y \cos r_a \\ r_y(1-\cos r_a) & r_x(1-\cos r_a) & -\sin r_a & r_x r_y \sin r_a - r_z \cos r \\ 0 & 2r_y(1-\cos r_a) & 0 & (r_y^2-1)\sin r_a \\ \sin r_a & r_z(1-\cos r_a) & r_y(1-\cos r_a) & r_y r_z \sin r_a + r_x \cos r_a \\ r_z(1-\cos r_a) & \sin r_a & r_x(1-\cos r_a) & r_z r_x \sin r_a + r_y \cos r_a \\ -\sin r_a & r_z(1-\cos r_a) & r_y(1-\cos r_a) & r_y r_z \sin r_a - r_x \cos r_a \\ 0 & 0 & 2r_z(1-\cos r_a) & (r_z^2-1)\sin r_a \end{bmatrix} \quad (34)$$

Also, if definition is made that $\overline{\omega}=[\overline{\omega}_x \overline{\omega}_y \overline{\omega}_z \theta]=[r_a r_x \, r_a r_y \, r_a r_z \, r_a]$, then $J_{r_{axis}\overline{\omega}}$ is the Jacobian matrix as shown in Expression (35).

$$J_{r_{axis}\overline{\omega}} = \begin{bmatrix} \frac{\partial r_x}{\partial \omega_x} & \frac{\partial r_x}{\partial \omega_y} & \frac{\partial r_x}{\partial \omega_z} & \frac{\partial r_x}{\partial \theta} \\ \frac{\partial r_y}{\partial \omega_x} & \frac{\partial r_y}{\partial \omega_y} & \frac{\partial r_y}{\partial \omega_z} & \frac{\partial r_y}{\partial \theta} \\ \frac{\partial r_z}{\partial \omega_x} & \frac{\partial r_z}{\partial \omega_y} & \frac{\partial r_z}{\partial \omega_z} & \frac{\partial r_z}{\partial \theta} \\ \frac{\partial r_a}{\partial \omega_x} & \frac{\partial r_a}{\partial \omega_y} & \frac{\partial r_a}{\partial \omega_z} & \frac{\partial r_a}{\partial \theta} \end{bmatrix} = \begin{bmatrix} \frac{1}{\theta} & 0 & 0 & -\frac{\varpi_x}{\theta^2} \\ 0 & \frac{1}{\theta} & 0 & -\frac{\varpi_y}{\theta^2} \\ 0 & 0 & \frac{1}{\theta} & -\frac{\varpi_z}{\theta^2} \\ 0 & 0 & 0 & 1 \end{bmatrix} \quad (35)$$

Further, $j_{\overline{\omega}\omega}$ is the Jacobian matrix as shown in Expression (36).

$$J_{\varpi\omega} = \begin{bmatrix} \frac{\partial \omega_x}{\partial \omega_x} & \frac{\partial \omega_x}{\partial \omega_y} & \frac{\partial \omega_x}{\partial \omega_z} \\ \frac{\partial \omega_y}{\partial \omega_x} & \frac{\partial \omega_y}{\partial \omega_y} & \frac{\partial \omega_y}{\partial \omega_z} \\ \frac{\partial \omega_z}{\partial \omega_x} & \frac{\partial \omega_z}{\partial \omega_y} & \frac{\partial \omega_z}{\partial \omega_z} \\ \frac{\partial \theta}{\partial \omega_x} & \frac{\partial \theta}{\partial \omega_y} & \frac{\partial \theta}{\partial \omega_z} \end{bmatrix} = \begin{bmatrix} 1 & 0 & 0 \\ 0 & 1 & 0 \\ 0 & 0 & 1 \\ \frac{\omega_x}{\theta} & \frac{\omega_y}{\theta} & \frac{\omega_z}{\theta} \end{bmatrix} \quad (36)$$

The Jacobian matrix $J_{Ft_p}$ of which each factor has a partial differential coefficient according to the position $t_{px}$, $t_{py}$, and $t_{pz}$ of the point marker not constrained on the plane of F and G can be written as shown in Expression (37).

$$J_{Ft_p} = J_{Fx_c} \cdot J_{x_c t_p} \quad (37)$$

$$= J_{Fx_c} \cdot \begin{bmatrix} \frac{\partial x_c}{\partial t_{px}} & \frac{\partial x_c}{\partial t_{py}} & \frac{\partial x_c}{\partial t_{pz}} \\ \frac{\partial y_c}{\partial t_{px}} & \frac{\partial y_c}{\partial t_{py}} & \frac{\partial y_c}{\partial t_{pz}} \\ \frac{\partial z_c}{\partial t_{px}} & \frac{\partial z_c}{\partial t_{py}} & \frac{\partial z_c}{\partial t_{pz}} \end{bmatrix}$$

$$= J_{Fx_c} \cdot \begin{bmatrix} R_{11} & R_{12} & R_{13} \\ R_{21} & R_{22} & R_{23} \\ R_{31} & R_{32} & R_{33} \end{bmatrix}$$

The Jacobian matrix $J_{Ft_s}$ of which each factor has a partial differential coefficient according to the position $t_{sx}$, $t_{sy}$, and $t_{sz}$ of the square marker not constrained on the plane of F and G can be written as shown in Expression (38).

$$J_{Ft_s} = J_{Fx_c} \cdot J_{x_c x_w} \cdot J_{x_w t_s} \quad (38)$$

$$= J_{Fx_c} \cdot \begin{bmatrix} \frac{\partial x_c}{\partial x_w} & \frac{\partial x_c}{\partial y_w} & \frac{\partial x_c}{\partial z_w} \\ \frac{\partial y_c}{\partial x_w} & \frac{\partial y_c}{\partial y_w} & \frac{\partial y_c}{\partial z_w} \\ \frac{\partial z_c}{\partial x_w} & \frac{\partial z_c}{\partial y_w} & \frac{\partial z_c}{\partial z_w} \end{bmatrix} \cdot \begin{bmatrix} \frac{\partial x_w}{\partial t_{sx}} & \frac{\partial x_w}{\partial t_{sy}} & \frac{\partial x_w}{\partial t_{sz}} \\ \frac{\partial y_w}{\partial t_{sx}} & \frac{\partial y_w}{\partial t_{sy}} & \frac{\partial y_w}{\partial t_{sz}} \\ \frac{\partial z_w}{\partial t_{sx}} & \frac{\partial z_w}{\partial t_{sy}} & \frac{\partial z_w}{\partial t_{sz}} \end{bmatrix}$$

$$= J_{Fx_c} \cdot \begin{bmatrix} R_{11} & R_{12} & R_{13} \\ R_{21} & R_{22} & R_{23} \\ R_{31} & R_{32} & R_{33} \end{bmatrix} \cdot \begin{bmatrix} 1 & 0 & 0 \\ 0 & 1 & 0 \\ 0 & 0 & 1 \end{bmatrix}$$

The Jacobian matrix $J_{F\omega_s}$ of which each factor has a partial differential coefficient according to the orientation $\omega_s$ of the square marker not constrained on the plane of F and G can be broken down as shown in Expression (39).

$$J_{F\omega_s} = J_{Fx_c} \cdot J_{x_c x_w} \cdot J_{x_w \omega_s} = J_{Fx_c} \cdot J_{x_c x_w} \cdot J_{x_w R_s} \cdot J_{R_s \omega_s} \quad (39)$$

$$= J_{Fx_c} \cdot J_{x_c x_w} \cdot \begin{bmatrix} x_s & 0 & 0 & y_s & 0 & 0 & 0 & 0 & 0 \\ 0 & x_s & 0 & 0 & y_s & 0 & 0 & 0 & 0 \\ 0 & 0 & x_s & 0 & 0 & y_s & 0 & 0 & 0 \end{bmatrix} \cdot J_{R_s \omega_s}$$

$J_{R_s \omega_s}$ can be obtained in the same way as Expressions (34) through (36).

Next, the Jacobian matrix $$J_{Ft_p^{pl}}$$

of which each factor has a partial differential coefficient according to the position $t^{pl}_{px}$ and $t^{pl}_{py}$ of the point marker constrained on the plane of F and G can be written as shown in Expression (40). $J_{x_c x_w}$ can be obtained in the same way as within Expression (38).

$$J_{Ft_p^{pl}} = J_{Fx_c} \cdot J_{x_c x_w} \cdot J_{x_w t_p^{pl}} = J_{Fx_c} \cdot J_{x_c x_w} \cdot \begin{bmatrix} \frac{\partial x_w}{\partial t_{px}^{pl}} & \frac{\partial x_w}{\partial t_{py}^{pl}} \\ \frac{\partial y_w}{\partial t_{px}^{pl}} & \frac{\partial y_w}{\partial t_{py}^{pl}} \\ \frac{\partial z_w}{\partial t_{px}^{pl}} & \frac{\partial z_w}{\partial t_{py}^{pl}} \end{bmatrix} \quad (40)$$

$$= J_{Fx_c} \cdot J_{x_c x_w} \cdot \begin{bmatrix} \cos\theta & 0 \\ \sin\theta\sin\phi & \cos\phi \\ -\sin\theta\cos\phi & \sin\phi \end{bmatrix}$$

The Jacobian matrix $$J_{Ft_s^{pl}}$$

of which each factor has a partial differential coefficient according to the position $t^{pl}_{sx}$ and $t^{pl}_{sy}$ of the square marker constrained on the plane of F and G can be written as shown in Expression (41).

$$J_{Ft_s^{pl}} = J_{Fx_c} \cdot J_{x_c x_w} \cdot J_{x_w x_p} \cdot J_{x_p t_s^{pl}} \quad (41)$$

$$= J_{Fx_c} \cdot J_{x_c x_w} \cdot \begin{bmatrix} \frac{\partial x_w}{\partial x_p} & \frac{\partial x_w}{\partial y_p} \\ \frac{\partial y_w}{\partial x_p} & \frac{\partial y_w}{\partial y_p} \\ \frac{\partial z_w}{\partial x_p} & \frac{\partial x_w}{\partial z_p} \end{bmatrix} \cdot \begin{bmatrix} \frac{\partial x_p}{\partial t_{sx}^{pl}} & \frac{\partial x_p}{\partial t_{sy}^{pl}} \\ \frac{\partial y_p}{\partial t_{sx}^{pl}} & \frac{\partial y_p}{\partial t_{sy}^{pl}} \end{bmatrix}$$

$$= J_{Fx_c} \cdot J_{x_c x_w} \cdot \begin{bmatrix} \cos\theta & 0 \\ \sin\theta\sin\phi & \cos\phi \\ -\sin\theta\cos\phi & \sin\phi \end{bmatrix} \cdot \begin{bmatrix} 1 & 0 \\ 0 & 1 \end{bmatrix}$$

The Jacobian matrix $J_{F\theta^{pl}}$ of which each factor has a partial differential coefficient according to the orientation $\theta^{pl}$ of the square marker constrained on the plane of F and G can be written as shown in Expression (42).

$$J_{F\theta^{pl}} = J_{Fx_c} \cdot J_{x_c x_w} \cdot J_{x_w x_p} \cdot J_{x_p \theta^{pl}} \quad (42)$$

$$= J_{Fx_c} \cdot J_{x_c x_w} \cdot \begin{bmatrix} \frac{\partial x_w}{\partial x_p} & \frac{\partial x_w}{\partial y_p} \\ \frac{\partial y_w}{\partial x_p} & \frac{\partial y_w}{\partial y_p} \\ \frac{\partial z_w}{\partial x_p} & \frac{\partial x_w}{\partial z_p} \end{bmatrix} \cdot \begin{bmatrix} \frac{\partial x_p}{\partial \theta^{pl}} \\ \frac{\partial y_p}{\partial \theta^{pl}} \end{bmatrix}$$

$$= J_{Fx_c} \cdot J_{x_c x_w} \cdot$$

$$\begin{bmatrix} \cos\theta & 0 \\ \sin\theta\sin\phi & \cos\phi \\ -\sin\theta\cos\phi & \sin\phi \end{bmatrix} \cdot \begin{bmatrix} -x_s\sin\theta^{pl} & -y_s\cos\theta^{pl} \\ -x_s\cos\theta^{pl} & -y_s\sin\theta^{pl} \end{bmatrix}$$

The Jacobian matrix $J_{Pr}$ of which each factor has a partial differential coefficient according to the plane parameters r, θ, and φ of F and G can be written as shown in Expression (43).

$$J_{Fr} = J_{Fx_c} \cdot J_{x_c x_w} \cdot J_{x_w r} \quad (43)$$

$$= J_{Fx_c} \cdot J_{x_c x_w} \cdot \begin{bmatrix} \frac{\partial x_w}{\partial r} & \frac{\partial x_w}{\partial \theta} & \frac{\partial x_w}{\partial \phi} \\ \frac{\partial y_w}{\partial r} & \frac{\partial y_w}{\partial \theta} & \frac{\partial y_w}{\partial \phi} \\ \frac{\partial z_w}{\partial r} & \frac{\partial z_w}{\partial \theta} & \frac{\partial z_w}{\partial \phi} \end{bmatrix}$$

$$= J_{Fx_c} \cdot J_{x_c x_w} \cdot$$

$$\begin{bmatrix} \sin\theta & -x_p \sin\theta + r\cos\theta & 0 \\ -\cos\theta\sin\phi & x_p \cos\theta\sin\phi + r\sin\theta\sin\phi & x_p \sin\theta\cos\phi - y_p \sin\phi - r\cos\theta\cos\phi \\ \cos\theta\cos\phi & -x_p \cos\theta\cos\phi - r\sin\theta\cos\phi & x_p \sin\theta\sin\phi + y_p \cos\phi - r\cos\theta\sin\phi \end{bmatrix}$$

Next, in Step S140, convergence is determined. Determination of convergence is performed by determining a condition, e.g., whether or not the absolute value of the correction value is less than a specified threshold, whether or not the difference between the calculated position of the projected position and the observed position is less than a specified threshold, whether or not the difference between the calculated position of the projected position and the observed position becomes the minimum value, or the like. In the event that determination is made that convergence is satisfied, estimation of the positions and orientations of markers is completed, otherwise, the flow returns to Step S110, where simultaneous equations are formulated again based on the corrected approximate values regarding the positions and orientations of the cameras, the positions of the point markers, the positions and orientations of the square markers, and the plane parameters.

As described above, with the present embodiment, a great number of images of the scene in which markers are disposed are photographed, the markers are detected and identified from the photographed images, the multiple markers present on the same plane are specified, correction values corresponding to the approximate values regarding the positions and orientations of the cameras taking the images, the positions and orientations of the markers not constrained on the plane, the positions and orientations of the markers constrained on the plane, and the plane parameters, are obtained based on the marker observed positions on the images and the constraint condition that the markers are present on the same plane, and then the approximate values are corrected with the obtained correction values. This operating cycle for obtaining correction values corresponding to the approximate values and correcting the approximate values with the obtained correction values is repeated, thus obtaining the positions and orientations of the markers so as to satisfy the constraint condition.

Note that with the present embodiment, the plane parameters are all unknown, but the present invention is not restricted to this; i.e., the plane parameters may be known. For example, in the event that the plane parameters can be easily obtained, such as the case of the x-y plane in the reference coordinate system, the plane parameters may be known. In the event that the plane parameters are known, the observation equation of the point markers constrained on the plane in Expression (22) is represented as shown in Expression (44).

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta \omega_x + \quad (44)$$

$$\frac{\partial F}{\partial \omega_y}\Delta \omega_y + \frac{\partial F}{\partial \omega_z}\Delta \omega_z + \frac{\partial F}{\partial t_{px}^{pl}}\Delta t_{px}^{pl} + \frac{\partial F}{\partial t_{py}^{pl}}\Delta t_{py}^{pl} = 0$$

$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x +$$

$$\frac{\partial G}{\partial \omega_y}\Delta \omega_y + \frac{\partial G}{\partial \omega_z}\Delta \omega_z + \frac{\partial G}{\partial t_{px}^{pl}}\Delta t_{px}^{pl} + \frac{\partial G}{\partial t_{py}^{pl}}\Delta t_{py}^{pl} = 0$$

Also, the observation equation of the square markers constrained on the plane in Expression (23) is represented as shown in Expression (45).

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta \omega_x + \frac{\partial F}{\partial \omega_y}\Delta \omega_y + \quad (45)$$

$$\frac{\partial F}{\partial \omega_z}\Delta \omega_z + \frac{\partial F}{\partial t_{sx}^{pl}}\Delta t_x^{pl} + \frac{\partial F}{\partial t_{sy}^{pl}}\Delta t_y^{pl} + \frac{\partial F}{\partial \theta^{pl}}\Delta \theta^{pl} = 0$$

$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x + \frac{\partial G}{\partial \omega_y}\Delta \omega_y +$$

$$\frac{\partial G}{\partial \omega_z}\Delta \omega_z + \frac{\partial G}{\partial t_{sx}^{pl}}\Delta t_{sx}^{pl} + \frac{\partial G}{\partial t_{sy}^{pl}}\Delta t_{sy}^{pl} + \frac{\partial G}{\partial \theta^{pl}}\Delta \theta^{pl} = 0$$

As described above, according to the present embodiment, in the event that there is a constraint condition regarding the placements of markers, the positions and orientations of markers can be obtained accurately by obtaining the positions and orientations of the markers so as to satisfy the constraint condition.

Second Embodiment

With the first embodiment, in the event that the constraint condition that multiple markers are present on the same plane is given as a constraint condition regarding the placements of markers, a method for estimating the positions and orientations of markers so as to satisfy the constraint condition has been described. With the second embodiment, description will be made regarding the case in which multiple markers are present on multiple planes, and the angle between the planes is known.

Note that description will be made here regarding the case in which two planes exist, and the angle between the two planes is known, but the number of planes is not restricted to two.

Figure 10:
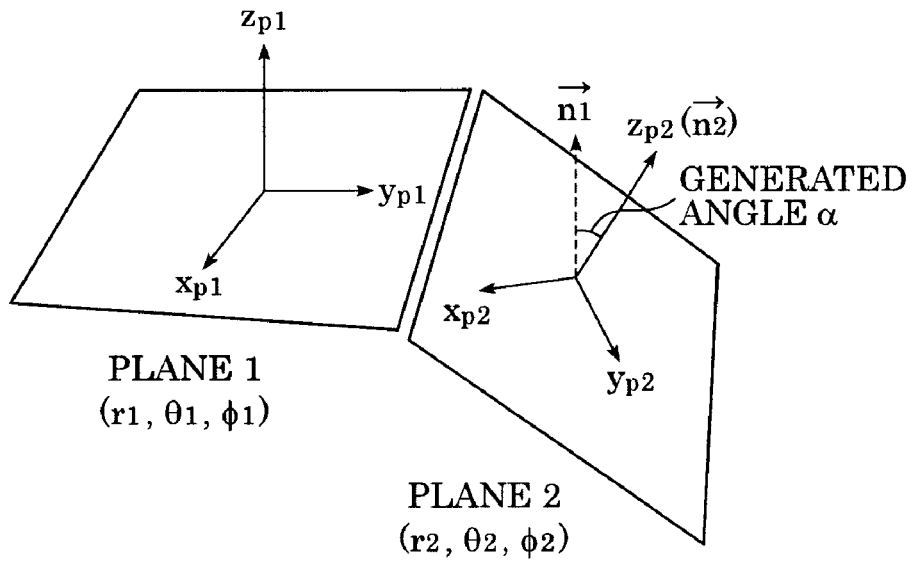
FIG. 10 is a diagram illustrating a case in which two planes constraining markers exist.

FIG. 10 illustrates the case in which two planes constraining markers exist. As described in the first embodiment, a plane 1 is represented with a polar coordinate expression $r_1 = [r_1 \; \theta_1 \; \phi_1]$ in the reference coordinate system.

On the other hand, a plane 2 is also represented with a polar coordinate expression $r_2 = [r_2 \; \theta_2 \; \phi_2]$, and let us say that $\theta_2$ and $\phi_2$ represent the orientation relative to the plane 1. More specifically, let us say that the orientation obtained when the plane 1 is rotated around the $y^{p1}$ axis by $\theta_2$, and then rotated around the $x_{p1}$ axis by $\phi_2$ is the orientation of a plane 2. Also, $r_2$ is the signed distance between the origin in the reference coordinate system and the plane 2. At this time, rotation matrixes $R^{p1}$ and $R^{p2}$ representing the orientations of the plane 1 and plane 2 can be written as shown in Expressions (47) and (48) respectively.

$$R^{p1} = \begin{bmatrix} R^{p1}_{11} & R^{p1}_{12} & R^{p1}_{13} \\ R^{p1}_{21} & R^{p1}_{22} & R^{p1}_{23} \\ R^{p1}_{31} & R^{p1}_{32} & R^{p1}_{33} \end{bmatrix} \quad (47)$$

$$= \begin{bmatrix} 1 & 0 & 0 \\ 0 & \cos\phi_1 & -\sin\phi_1 \\ 0 & \sin\phi_1 & \cos\phi_1 \end{bmatrix} \begin{bmatrix} \cos\theta_1 & 0 & \sin\theta_1 \\ 0 & 1 & 0 \\ -\sin\theta_1 & 0 & \cos\theta_1 \end{bmatrix}$$

$$= \begin{bmatrix} \cos\theta_1 & 0 & \sin\theta_1 \\ \sin\theta_1\sin\phi_1 & \cos\phi_1 & -\cos\theta_1\sin\phi_1 \\ -\sin\theta_1\cos\phi_1 & \sin\phi_1 & \cos\theta_1\cos\phi_1 \end{bmatrix}$$

$$R^{p2} = \begin{bmatrix} R^{p2}_{11} & R^{p2}_{12} & R^{p2}_{13} \\ R^{p2}_{21} & R^{p2}_{22} & R^{p2}_{23} \\ R^{p2}_{31} & R^{p2}_{32} & R^{p2}_{33} \end{bmatrix} \quad (48)$$

$$= \begin{bmatrix} 1 & 0 & 0 \\ 0 & \cos\phi_2 & -\sin\phi_2 \\ 0 & \sin\phi_2 & \cos\phi_2 \end{bmatrix} \begin{bmatrix} \cos\theta_2 & 0 & \sin\theta_2 \\ 0 & 1 & 0 \\ -\sin\theta_2 & 0 & \cos\theta_2 \end{bmatrix} \cdot R^{p1}$$

$$= \begin{bmatrix} \cos\theta_2 & 0 & \sin\theta_2 \\ \sin\theta_2\sin\phi_2 & \cos\phi_2 & -\cos\theta_2\sin\phi_2 \\ -\sin\theta_2\cos\phi_2 & \sin\phi_2 & \cos\theta_2\cos\phi_2 \end{bmatrix}$$

$$\begin{bmatrix} \cos\theta_1 & 0 & \sin\theta_1 \\ \sin\theta_1\sin\phi_1 & \cos\phi_1 & -\cos\theta_1\sin\phi_1 \\ -\sin\theta_1\cos\phi_1 & \sin\phi_1 & \cos\theta_1\cos\phi_1 \end{bmatrix}$$

Here, the angle between the normal line vector of the plane 1 $\vec{n}_1$ and the normal line vector of the plane 2 $\vec{n}_2$ is $\alpha$, so Expression (49) holds.

$$\cos\alpha = \frac{\vec{n}_1 \cdot \vec{n}_2}{|\vec{n}_1| \cdot |\vec{n}_2|} = \cos\theta_2 \cos\phi_2 = \text{constant} \quad (49)$$

Here, $\phi_2$ can be obtained with $\theta_2$ and $\alpha$ from Expression (49).

The observation equations of point markers and square markers constrained on the plane 1 are the same as Expressions (22) and (23) according to the first embodiment. On the other hand, the plane 2 becomes the functions of $r_2$ and $\theta_2$, so the observation equations of point markers and square markers constrained on the plane 2 are represented as shown in Expression (50) and Expression (51), respectively.

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta\omega_x + \frac{\partial F}{\partial \omega_y}\Delta\omega_y + \quad (50)$$
$$\frac{\partial F}{\partial \omega_z}\Delta\omega_z + \frac{\partial F}{\partial t^{pl}_{px}}\Delta t^{pl}_{px} + \frac{\partial F}{\partial t^{pl}_{py}}\Delta t^{pl}_{py} + \frac{\partial F}{\partial r_2}\Delta r_2 + \frac{\partial F}{\partial \theta_2}\Delta\theta_2 = 0$$

$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta\omega_x + \frac{\partial G}{\partial \omega_y}\Delta\omega_y + $$
$$\frac{\partial G}{\partial \omega_z}\Delta\omega_z + \frac{\partial G}{\partial t^{pl}_{px}}\Delta t^{pl}_{px} + \frac{\partial G}{\partial t^{pl}_{py}}\Delta t^{pl}_{py} + \frac{\partial G}{\partial r_2}\Delta r_2 + \frac{\partial G}{\partial \theta_2}\Delta\theta_2 = 0$$

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta\omega_x + \frac{\partial F}{\partial \omega_y}\Delta\omega_y + \frac{\partial F}{\partial \omega_z}\Delta\omega_z + \quad (51)$$
$$\frac{\partial F}{\partial t^{pl}_{sx}}\Delta t^{pl}_x + \frac{\partial F}{\partial t^{pl}_{sy}}\Delta t^{pl}_y + \frac{\partial F}{\partial \theta^{pl}}\Delta\theta^{pl} + \frac{\partial F}{\partial r_2}\Delta r_2 + \frac{\partial F}{\partial \theta_2}\Delta\theta_2 = 0$$

$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta\omega_x + \frac{\partial G}{\partial \omega_y}\Delta\omega_y + \frac{\partial G}{\partial \omega_z}\Delta\omega_z + $$
$$\frac{\partial G}{\partial t^{pl}_{sx}}\Delta t^{pl}_x + \frac{\partial G}{\partial t^{pl}_{sy}}\Delta t^{pl}_y + \frac{\partial G}{\partial \theta^{pl}}\Delta\theta^{pl} + \frac{\partial G}{\partial r_2}\Delta r_2 + \frac{\partial G}{\partial \theta_2}\Delta\theta_2 = 0$$

With the present embodiment, in the event of obtaining the positions and orientations of markers, simultaneous equations are formulated based on observation equations (22), (23), (50), and (51), correction values as to the approximate values regarding the positions and orientations of the cameras, the positions and orientations of the markers, the three parameters of the plane 1, and the two parameters of the plane 2 are obtained, and the approximate values are optimized using repeated calculation. Note that in the event of obtaining $\phi_2$ from Expression (49), two solutions having a different sign are obtained, but of these two solutions of $\phi_2$, the one solution reducing projection error as to $\theta_2$ obtained for each repeated calculation more than the other is employed as the solution.

As described above, with the present embodiment, in the case in which multiple markers are present on multiple planes as a constraint condition regarding the placements of markers, and also the angle between these planes is known, the positions and orientations of the markers can be obtained so as to satisfy the constraint condition.

Third Embodiment

With the third embodiment, description will be made regarding a method for estimating the positions and orientations of markers in the case in which the normal vector directions of markers are the same, such as multiple plane markers, as a constraint condition regarding the placements of markers.

Figure 11:
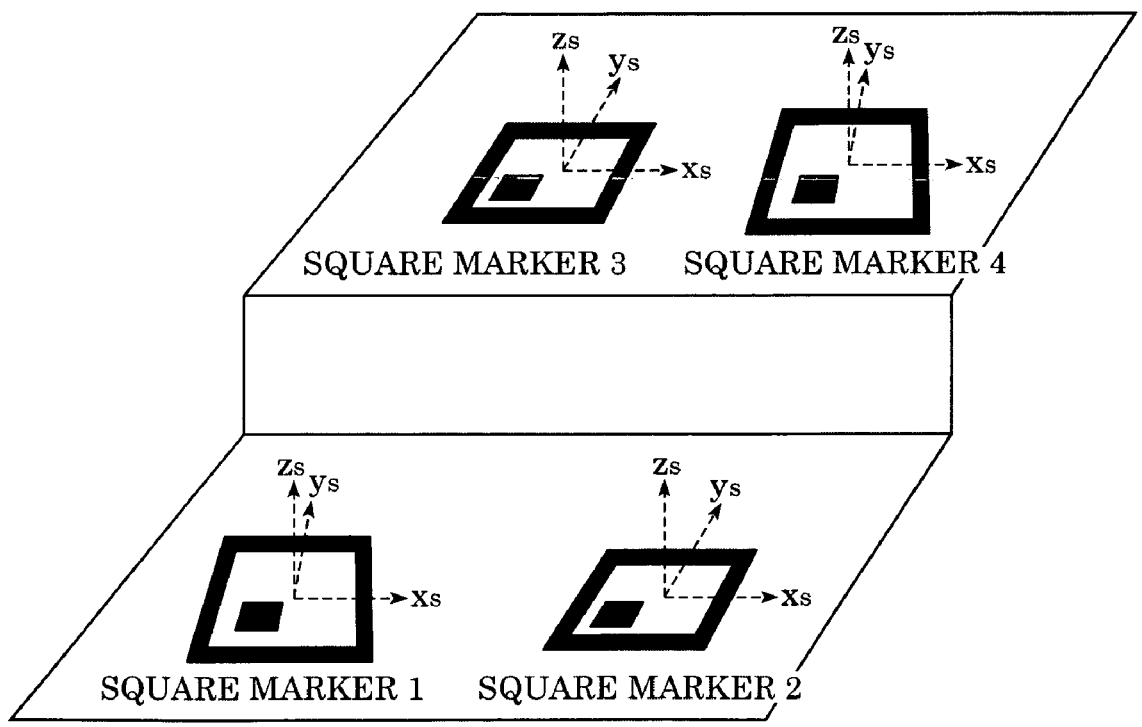
FIG. 11 is a diagram illustrating marker placements to which a third embodiment can be applied.

FIG. 11 is a diagram illustrating marker placements to which the third embodiment can be applied. In the drawing, let us say that four square markers are disposed, and the normal vectors of the four square markers, i.e., the direction of the $z_s$ axis of each square marker is the same.

The normal vector directions of the square markers will be represented with $\theta$ and $\phi$. Let us say that the normal vector is a vector obtained by the unit vector of the z axis in the reference coordinate system being rotated around the x axis by $\theta$, and then being rotated around the y axis by $\phi$. Also, $\theta$ and $\phi$ have the common value for the multiple square markers having the same normal vector direction. If we say that the rotation around the z axis of each square marker is $\psi$, the orientation $R_s$ of the square marker as to the reference coordinate system is represented with Expression (52).

$$R_s = \begin{bmatrix} R_{s11} & R_{s12} & R_{s13} \\ R_{s21} & R_{s22} & R_{s23} \\ R_{s31} & R_{s32} & R_{s33} \end{bmatrix} \quad (52)$$

$$= \begin{bmatrix} \cos\phi & 0 & \sin\phi \\ 0 & 1 & 0 \\ -\sin\phi & 0 & \cos\phi \end{bmatrix} \begin{bmatrix} 1 & 0 & 0 \\ 0 & \cos\theta & -\sin\theta \\ 0 & \sin\theta & \cos\theta \end{bmatrix}$$

$$= \begin{bmatrix} \cos\psi & -\sin\psi & 0 \\ \sin\psi & \cos\psi & 0 \\ 0 & 0 & 1 \end{bmatrix}$$

If we say that the position of each square marker in the reference coordinate system is $t_s = [t_{sx}\ t_{sy}\ t_{sz}]^t$, the position $x_w$ in the reference coordinate system of the point $x_s = [x_s\ y_s]^t$ on the square marker is represented with Expression (53).

$$\begin{bmatrix} x_w \\ y_w \\ z_w \end{bmatrix} = \begin{bmatrix} R_{s11} & R_{s12} & t_{sx} \\ R_{s21} & R_{s22} & t_{sy} \\ R_{s31} & R_{s32} & t_{sz} \end{bmatrix} \begin{bmatrix} x_s \\ y_s \\ 1 \end{bmatrix} \quad (53)$$

With the present embodiment, the position in the reference coordinate system of each vertex of each square marker forms the function of the normal vector directions $\theta$ and $\phi$, z-axial orientation of the square markers $\psi$, and the position $t_s$ in the reference coordinate system of each square marker. Accordingly, the observation equation of each vertex of a square marker of which the normal vector being constrained is represented with Expression (54).

$$F^0 + \frac{\partial F}{\partial t_x}\Delta t_x + \frac{\partial F}{\partial t_y}\Delta t_y + \frac{\partial F}{\partial t_z}\Delta t_z + \frac{\partial F}{\partial \omega_x}\Delta \omega_x + \frac{\partial F}{\partial \omega_y}\Delta \omega_y + \frac{\partial F}{\partial \omega_z}\Delta \omega_z + \quad (54)$$
$$\frac{\partial F}{\partial t_{sx}}\Delta t_{sx} + \frac{\partial F}{\partial t_{sy}}\Delta t_{sy} + \frac{\partial F}{\partial t_{sz}}\Delta t_{sz} + \frac{\partial F}{\partial \theta}\Delta\theta + \frac{\partial F}{\partial \phi}\Delta\phi + \frac{\partial F}{\partial \psi}\Delta\psi = 0$$
$$G^0 + \frac{\partial G}{\partial t_x}\Delta t_x + \frac{\partial G}{\partial t_y}\Delta t_y + \frac{\partial G}{\partial t_z}\Delta t_z + \frac{\partial G}{\partial \omega_x}\Delta \omega_x + \frac{\partial G}{\partial \omega_y}\Delta \omega_y + \frac{\partial G}{\partial \omega_z}\Delta \omega_z +$$
$$\frac{\partial G}{\partial t_{sx}}\Delta t_{sx} + \frac{\partial G}{\partial t_{sy}}\Delta t_{sy} + \frac{\partial G}{\partial t_{sz}}\Delta t_{sz} + \frac{\partial G}{\partial \theta}\Delta\theta + \frac{\partial G}{\partial \phi}\Delta\phi + \frac{\partial G}{\partial \psi}\Delta\psi = 0$$

With the present embodiment, in the event of obtaining the positions and orientations of markers, simultaneous equations are formulated based on the multiple observation equations (54), correction values as to the approximate values regarding the positions and orientations of the cameras, the positions and orientations of markers, and the normal vector directions $\theta$ and $\phi$ are obtained, and then the approximate values are optimized using repeated calculation.

As described above, with the present embodiment, in the event of multiple markers having the common normal vector direction as a constraint condition regarding the placements of markers, the positions and orientations of the markers can be obtained so as to satisfy the constraint condition.

Fourth Embodiment

With the first, second, and third embodiments, the positions and orientations of markers have been obtained under one constraint condition regarding the placements of markers. With the fourth embodiment, a method for obtaining the positions and orientations of markers under multiple constraint conditions will be described.

Figure 12:
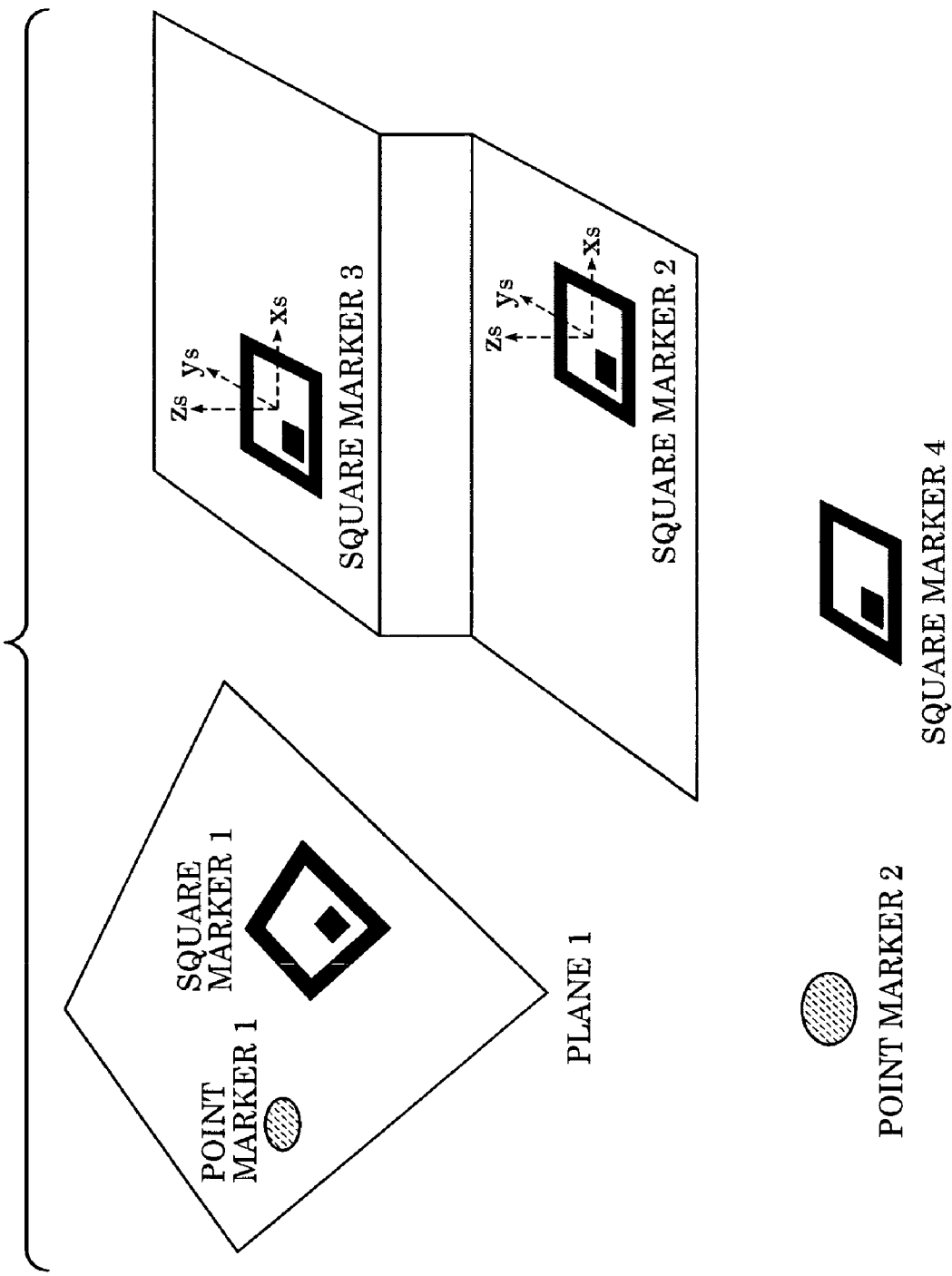
FIG. 12 is a diagram illustrating marker placements to which a fourth embodiment can be applied.

FIG. 12 is a diagram illustrating marker placements to which the present embodiment can be applied. The drawing illustrates the case in which a point marker 1 and a square marker 1 exist on the same plane (plane 1), a square marker 2 and a square marker 3 have the common normal vector direction, and a point marker 2 and a square marker 4 have no constraint conditions regarding placement thereof.

Upon the scene illustrated in FIG. 12 being photographed with an imaging device, observation equation (22) holds for the point marker 1, observation equation (23) for the square marker 1, observation equation (54) for the square markers 2 and 3, observation equation (20) for the point marker 2, and observation equation (21) for the square marker 4. Expressions (20) through (23) and (54) are observation equations regarding the correction value of the position and orientation of one camera, the correction value of the position and orientation of one marker, the correction value of one plane parameter, and the correction value of one normal vector direction. With the present embodiment, as shown in Expression (55), observation equations are formulated regarding the correction values of the positions and orientations of N cameras, the correction values of the positions of $K_{p1}$ point markers not constrained on the plane, the correction values of the positions of $K_{p2}$ point markers constrained on the plane, the correction values of the positions and orientations of $K_{s1}$ square markers not constrained on the plane, the correction values of the positions and orientations of $K_{s2}$ square markers constrained on the plane, the correction values of the positions and orientations of $K_{s3}$ square markers of which the normal vectors are constrained, the correction values of P plane parameters, and the correction values of V normal vector directions.

$$F^0 + \sum_{i=1}^{N}\left(\frac{\partial F}{\partial t_{ix}}\Delta t_{ix} + \frac{\partial F}{\partial t_{iy}}\Delta t_{iy} + \right. \quad (55)$$
$$\left. \frac{\partial F}{\partial t_{iz}}\Delta t_{iz} + \frac{\partial F}{\partial \omega_{ix}}\Delta \omega_{ix} + \frac{\partial F}{\partial \omega_{iy}}\Delta \omega_{iy} + \frac{\partial F}{\partial \omega_{iz}}\Delta \omega_{iz}\right) +$$
$$\sum_{i=1}^{K_{p1}}\left(\frac{\partial F}{\partial t_{pix}}\Delta t_{pix} + \frac{\partial F}{\partial t_{piy}}\Delta t_{piy} + \frac{\partial F}{\partial t_{piz}}\Delta t_{piz}\right) +$$
$$\sum_{i=1}^{K_{s1}}\left(\frac{\partial F}{\partial t_{six}}\Delta t_{six} + \frac{\partial F}{\partial t_{siy}}\Delta t_{siy} + \frac{\partial F}{\partial t_{siz}}\Delta t_{siz} + \right.$$
$$\left. \frac{\partial F}{\partial \omega_{six}}\Delta \omega_{six} + \frac{\partial F}{\partial \omega_{siy}}\Delta \omega_{siy} + \frac{\partial F}{\partial \omega_{siz}}\Delta \omega_{siz}\right) +$$
$$\sum_{i=1}^{K_{p2}}\left(\frac{\partial F}{\partial t_{pix}^{pl}}\Delta t_{pix}^{pl} + \frac{\partial F}{\partial t_{piy}^{pl}}\Delta t_{piy}^{pl}\right) +$$
$$\sum_{i=1}^{K_{s2}}\left(\frac{\partial F}{\partial t_{six}^{pl}}\Delta t_{six}^{pl} + \frac{\partial F}{\partial t_{siy}^{pl}}\Delta t_{siy}^{pl} + \frac{\partial F}{\partial \theta^{pl}}\Delta\theta^{pl}\right) +$$
$$\sum_{i=1}^{K_{s3}}\left(\frac{\partial F}{\partial t_{six}^{v}}\Delta t_{six}^{v} + \frac{\partial F}{\partial t_{siy}^{v}}\Delta t_{siy}^{v} + \frac{\partial F}{\partial t_{siy}^{v}}\Delta t_{siy}^{v} + \frac{\partial F}{\partial \Psi}\Delta\Psi\right) +$$
$$\sum_{i=1}^{P}\left(\frac{\partial F}{\partial r}\Delta r + \frac{\partial F}{\partial \theta}\Delta\theta + \frac{\partial F}{\partial \phi}\Delta\phi\right) +$$
$$\sum_{i=1}^{V}\left(\frac{\partial F}{\partial \theta^{v}}\Delta\theta^{v} + \frac{\partial F}{\partial \phi^{v}}\Delta\phi^{v}\right) = 0$$

-continued $$G^0 + \sum_{i=1}^{N}\left(\frac{\partial G}{\partial t_{ix}}\Delta t_{ix} + \frac{\partial G}{\partial t_{iy}}\Delta t_{iy} + \frac{\partial G}{\partial t_{iz}}\Delta t_{iz} + \right.$$

$$\frac{\partial G}{\partial \omega_{ix}}\Delta\omega_{ix} + \frac{\partial G}{\partial \omega_{iy}}\Delta\omega_{iy} + \frac{\partial G}{\partial \omega_{iz}}\Delta\omega_{iz}\right) +$$

$$\sum_{i=1}^{K_{p1}}\left(\frac{\partial G}{\partial t_{pix}}\Delta t_{pix} + \frac{\partial G}{\partial t_{piy}}\Delta t_{piy} + \frac{\partial G}{\partial t_{piz}}\Delta t_{piz}\right) +$$

$$\sum_{i=1}^{K_{s1}}\left(\frac{\partial G}{\partial t_{six}}\Delta t_{six} + \frac{\partial G}{\partial t_{siy}}\Delta t_{siy} + \frac{\partial G}{\partial t_{siz}}\Delta t_{siz} + \right.$$

$$\frac{\partial G}{\partial \omega_{six}}\Delta\omega_{six} + \frac{\partial G}{\partial \omega_{siy}}\Delta\omega_{siy} + \frac{\partial G}{\partial \omega_{siz}}\Delta\omega_{siz}\right) +$$

$$\sum_{i=1}^{K_{p2}}\left(\frac{\partial G}{\partial t^{pl}_{pix}}\Delta t^{pl}_{pix} + \frac{\partial G}{\partial t^{pl}_{piy}}\Delta t^{pl}_{piy}\right) +$$

$$\sum_{i=1}^{K_{s2}}\left(\frac{\partial G}{\partial t^{pl}_{six}}\Delta t^{pl}_{six} + \frac{\partial G}{\partial t^{pl}_{siy}}\Delta t^{pl}_{siy} + \frac{\partial G}{\partial \theta^{pl}}\Delta\theta^{pl}\right) +$$

$$\sum_{i=1}^{K_{s3}}\left(\frac{\partial G}{\partial t^{v}_{six}}\Delta t^{v}_{six} + \frac{\partial G}{\partial t^{v}_{siy}}\Delta t^{v}_{siy} + \frac{\partial G}{\partial t^{v}_{siy}}\Delta t^{v}_{siy} + \frac{\partial G}{\partial \Psi}\Delta\Psi\right) +$$

$$\sum_{i=1}^{P}\left(\frac{\partial G}{\partial r}\Delta r + \frac{\partial G}{\partial \theta}\Delta\theta + \frac{\partial G}{\partial \phi}\Delta\phi\right) + \sum_{i=1}^{V}\left(\frac{\partial G}{\partial \theta^{v}}\Delta\theta^{v} + \frac{\partial G}{\partial \phi^{v}}\Delta\phi^{v}\right) = 0$$

Expression (55) serving as an observation equation is formulated for each point marker, and each vertex of each square marker detected on the photographed images, and is solved as simultaneous equations, thus simultaneously obtaining correction values corresponding to the approximate values regarding a camera position $t_i$, camera orientation $\omega_i$, placement-unconstrained point marker position $t_{pi}$, placement-unconstrained square marker position $t_{si}$, orientation $\omega_{si}$, on-plane-constrained point marker position $t^{pl}_{pi}$, on-plane-constrained square marker position $t^{pl}_{si}$, orientation $\theta^{pl}_i$, normal-vector-constrained square marker position $t^{v}_{si}$, orientation $\psi_i$, plane parameter $r_i$, normal vector directions $\theta^{v}_i$ and $\phi^{v}_i$, and optimizing the approximate values by repeating correction of the approximate values using repeated calculation.

A GUI (Graphical User Interface) for setting the marker placement conditions according to the present embodiment is illustrated in FIGS. 15A through 15C. With the GUI in FIGS. 15A through 15C, grouping of markers, and the constraint condition type of each group can be set. The GUI in FIGS. 15A through 15C further include a function for setting a constraint condition type in addition to the GUI in FIG. 5. Upon the user clicking near the selecting marker (in FIG. 15A) with the right mouse button, a dialog box (FIG. 15B) for selecting a constraint condition is displayed. Subsequently, the user sets a constraint condition (e.g., plane constraint, normal vector constraint, straight line constraint) as to the selected marker group, using this dialog box. Note that other formats for the user interface may be used, for example, a menu as illustrated in FIG. 15C may be employed instead of the dialog box illustrated in FIG. 15B.

As described above, with the present embodiment, in the case in which multiple constraint conditions regarding the placements of markers exist, the positions and orientations of markers can be obtained so as to satisfy all of the constraint conditions. Thus, the positions and orientations of the markers can be accurately obtained.

First Modification

Figure 13:
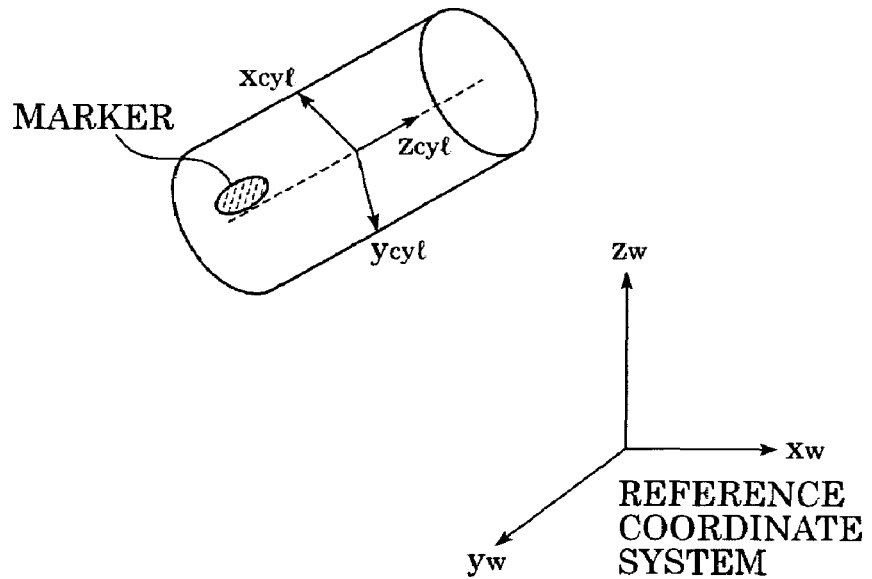
FIG. 13 is a diagram illustrating a marker being constrained on the side face of a cylinder.

As illustrated in FIG. 13, a marker may be constrained on the side face of a cylinder. With the cylinder, the origin is taken in the center of the cylinder coordinate system, and the cylinder coordinate system is taken as illustrated in the drawing. The orientation of the cylinder is represented with a rotation $\theta$ around the x axis and a rotation $\phi$ around the y axis. A rotation matrix $R_{cyl}$ representing the orientation of the cylinder is represented as shown in Expression (56).

$$R_{cyl} = \begin{bmatrix} R_{cyl11} & R_{cyl12} & R_{cyl13} \\ R_{cyl21} & R_{cyl22} & R_{cyl23} \\ R_{cyl31} & R_{cyl32} & R_{cyl33} \end{bmatrix} = \begin{bmatrix} \cos\phi & 0 & \sin\phi \\ 0 & 1 & 0 \\ -\sin\phi & 0 & \cos\phi \end{bmatrix}\begin{bmatrix} 1 & 0 & 0 \\ 0 & \cos\theta & -\sin\theta \\ 0 & \sin\theta & \cos\theta \end{bmatrix} \quad (56)$$

If we say that the position of the origin of the cylinder in the reference coordinate system is $t^{cyl}=[t^{cyl}_x, t^{cyl}_y, t^{cyl}_z]^t$, the position $x_w$ of a point $x_{cyl}=[x_{cyl}, y_{cyl}, z_{cyl}]^t$ on the cylinder coordinate system in the reference coordinate system is represented as shown in Expression (57).

$$\begin{bmatrix} x_w \\ y_w \\ z_w \\ 1 \end{bmatrix} = \begin{bmatrix} R_{cyl11} & R_{cyl12} & R_{cyl13} & t^{cyl}_x \\ R_{cyl21} & R_{cyl22} & R_{cyl23} & t^{cyl}_y \\ R_{cyl31} & R_{cyl32} & R_{cyl33} & t^{cyl}_z \\ 0 & 0 & 0 & 1 \end{bmatrix}\begin{bmatrix} x_{cyl} \\ y_{cyl} \\ z_{cyl} \\ 1 \end{bmatrix} \quad (57)$$

Also, a point on the side face of the cylinder is represented with Expression (58) in the cylinder coordinate system, from the rotation angle $\beta$ around the $z_{cyl}$ axis, the $z_{cyl}$ coordinate d, and a known cylinder radius $r_{cyl}$.

$$\begin{bmatrix} x_{cyl} \\ y_{cyl} \\ z_{cyl} \end{bmatrix} = \begin{bmatrix} r_{cyl}\cos\beta \\ r_{cyl}\sin\beta \\ d \end{bmatrix} \quad (58)$$

The projected position of the marker constrained on the side face of the cylinder forms a function regarding the position and orientation of the camera, the position and orientation of the cylinder, and the positions $\beta$ and d of the marker on the cylinder, so the position of the marker constrained on the side face of the cylinder can be obtained by solving the observation equation for obtaining these correction values.

Second Modification

Figure 14:
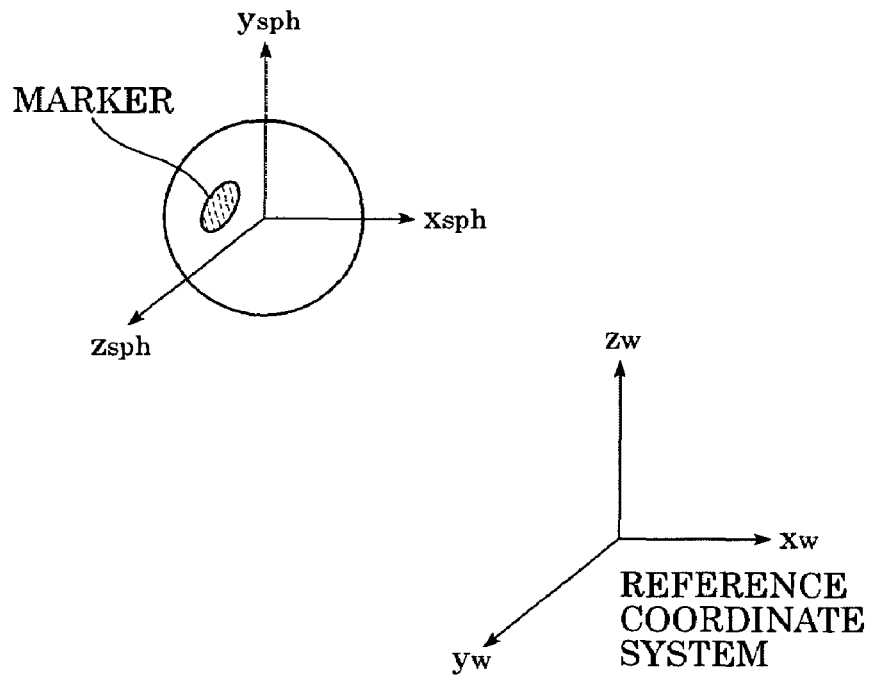
FIG. 14 is a diagram illustrating a marker being constrained on a spherical surface.

As illustrated in FIG. 14, a marker may be constrained on a surface of a sphere. The sphere coordinate system is taken at the center of the sphere. A sphere has no directionality, and accordingly is represented with only the position as to the reference coordinate system. If we say that the position of the origin of the sphere coordinate system in the reference coordinate system is $t^{sph}=[t^{sph}_x, t^{sph}_y, t^{sph}_z]^t$, the position $x_w$ of a point $x_{sph}=[x_{sph}, y_{sph}, z_{sph}]^t$ on the sphere coordinate system in the reference coordinate system is represented as shown in Expression (59).

$$\begin{bmatrix} x_w \\ y_w \\ z_w \end{bmatrix} = \begin{bmatrix} x_{sph} + t_x^{sph} \\ y_{sph} + t_y^{sph} \\ z_{sph} + t_z^{sph} \end{bmatrix} \quad (59)$$

Also, a point on the surface of the sphere having a known radius $r_{sph}$ and angles θ and φ is represented with Expression (60) in the sphere coordinate system.

$$\begin{bmatrix} x_{cyl} \\ y_{cyl} \\ z_{cyl} \end{bmatrix} = \begin{bmatrix} r_{sph}\cos\theta\cos\phi \\ r_{sph}\sin\theta\cos\phi \\ r_{sph}\sin\phi \end{bmatrix} \quad (60)$$

The projected position of the marker constrained on the sphere surface forms a function regarding the position and orientation of the camera, the position of the sphere, and the positions θ and φ of the marker on the sphere surface, so the position of the marker constrained on the sphere surface can be obtained by solving the observation equation for obtaining these correction values.

Third Modification

A marker may be constrained on a straight line. If we say that a point where the straight line passes through is $t_l = [t_{lx}, t_{ly}, t_{lz}]^t$, and a directional vector is $d = [d_x, d_y, d_z]^t$, the position of the marker present on the straight line in the reference coordinate system is represented with Expression (61). Here, s is a variable representing the marker position on the straight line.

$$\begin{bmatrix} x_w \\ y_w \\ z_w \end{bmatrix} = \begin{bmatrix} t_{lx} + sd_x \\ t_{ly} + sd_y \\ t_{lz} + sd_z \end{bmatrix} \quad (61)$$

The projected position of the marker constrained on the straight line forms a function regarding the position and orientation of the camera, the point $t_l$ where the straight line passes through, the directional vector d of the straight line, and the position s of the marker on the straight line, so the position of the marker constrained on the straight line can be obtained by solving the observation equation for obtaining these correction values.

Fourth Modification

With the aforementioned embodiments, a method for subjecting observation equations to Taylor expansion, and repeating correction utilizing as far as primary items has been described as a method for correcting marker placement information. This is a method for estimating the amount of correction of unknown parameters in the case of assuming that observation equations are subjected to linearization locally in one process of repetition, and result in no error, and is a method equivalent to a method generally known as the Newton method. The Newton method is a typical method for solving a nonlinear equation using numerical computation, but a repeated calculation method used for the aforementioned embodiments is not restricted to this. For example, the amount of correction may be dynamically changed based on the variance of the amount of correction of an unknown parameter to be estimated in one process, such as with the similarly-known Levenberg-Marquardt method. Alternately; a method for performing repeated calculation in light of the results of Taylor expansion including higher order terms may be employed. The essence of the present invention is obtaining the most appropriate solution using various types of markers even in the event that multiple types of markers having different placement information are mixed, and accordingly, specific methodology for repeated calculation serving as a numerical solution never detracts from the essence of the present invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-144891 filed May 14, 2004, which is hereby incorporated by reference herein.

What is claimed is:

1. A marker placement information estimating method for an information processing device to estimate spatial placement information of a plurality of markers present within space under a geometric constraint, the marker placement information estimating method comprising:

a marker detecting step for detecting markers from a photographed image including markers taken by an imaging unit;

a constraint condition setting step for setting a constraint condition of markers;

a marker projected position calculating step, performed by a marker projected position calculation unit of the information processing device, for calculating a projected position where a marker is projected on an image surface based on an approximate value of a position and orientation of the imaging unit used to take the photographed image and an approximate value of placement information of the marker;

a correction value calculating step for calculating a first correction value for correcting the placement information of the plurality of markers and a second correction value for correcting the position and orientation of the imaging unit used to take the photographed image so as to reduce a sum of error between a position of the marker on the image surface detected in the marker detecting step and the projected position of the marker on the image surface obtained in the marker projected position calculating step, the first correction value satisfying the constraint condition of markers set in the constraint condition setting step;

a placement information correcting step for correcting the placement information of the plurality of markers based on the first correction value obtained in the correction value calculating step; and a repeated calculating step for calculating the placement information of the plurality of markers by repeatedly performing the marker projected position calculating step, the correction value calculating step, and the placement information correcting step using the corrected placement information of the plurality of markers and a corrected approximated value of the position and orientation of the imaging unit instead of the approximate value of placement information of the marker and the approximate value of the position and orientation of the imaging unit, wherein the corrected approximated value of the position and orientation of the imaging unit is calculated based on the second correction value, and wherein the repeated calculating step is repeatedly performed until a convergence requirement is met for reducing the sum of the error between the position of the marker on the image surface detected in the marker detecting step and the projected position of the marker on the image surface obtained in the marker projected position calculating step.

2. The marker placement information estimating method according to claim 1, wherein the constraint condition is represented by an equation unique to the constraint condition, and the placement information satisfying the constraint condition is represented by a placement information parameter unique to the constraint condition.

3. The marker placement information estimating method according to claim 2, wherein the constraint condition is a constraint condition that markers exist on the same unknown plane, the equation unique to the constraint condition is a plane equation, and the placement information parameters are a position of the marker on the plane and a rotation angle of which a rotation axis is a normal vector of the plane.

4. The marker placement information estimating method according to claim 1, wherein the markers have planar shapes.

5. The marker placement information estimating method according to claim 2, wherein markers present within the space are markers of which the placement information can be defined as position and orientation, wherein the constraint condition is a constraint condition that the directions of normal vectors of a plurality of markers are the same, the equation unique to the constraint condition is a normal vector equation, and the placement information parameters are the position of the marker and a rotation angle of which rotation axis is the normal vector.

6. The marker placement information estimating method according to claim 2, wherein there are a plurality of the constraint conditions, and the placement information of the marker is estimated by obtaining the equation unique to each constraint condition and the placement information parameter of the marker regarding the plurality of constraint conditions.

7. An information processing device for estimating spatial placement information of a plurality of markers present within space under a geometric constraint, the information processing device comprising:

a marker detecting unit adapted to detect markers from a photographed image including markers taken by an imaging unit;

a constraint condition setting unit adapted to set a constraint condition of markers;

a marker projected position calculating unit adapted to calculate a projected position where a marker is projected on an image surface based on an approximate value of a position and orientation of the imaging unit used to take the photographed image and an approximate value of placement information of the marker;

a correction value calculating unit adapted to calculate a first correction value for correcting the placement information of the plurality of markers and a second correction value for correcting the position and orientation of the imaging unit used to take the photographed image so as to reduce a sum of error between a position of the marker on the image surface detected by the marker detecting unit and the projected position of the marker on the image surface obtained by the marker projected position calculating unit, the first correction value satisfying the constraint condition of markers set by the constraint condition setting unit;

a placement information correcting unit adapted to correct the placement information of the plurality of markers based on the first correction value obtained by the correction value calculating unit; and a repeated calculating unit adapted to calculate the placement information of the plurality of markers by repeatedly performing processing by the marker projected position calculating unit, the correction value calculating unit, and the placement information correcting unit using the corrected placement information of the plurality of markers and a corrected approximated value of the position and orientation of the imaging unit instead of the approximate value of placement information of the marker and approximate value of the position and orientation of the imaging unit, wherein the corrected approximated value of the position and orientation of the imaging unit is calculated based on the second correction value, and wherein the processing performed by the repeated calculating unit is repeatedly performed until a convergence requirement is met for reducing the sum of the error between the position of the marker on the image surface detected by the marker detecting unit and the projected position of the marker on the image surface obtained by the marker projected position calculating unit.

8. A computer-readable medium for storing a program for realizing the marker placement information estimating method according to claim 1.

* * * * *